(12) United States Patent
Shimada

(10) Patent No.: US 8,489,826 B2
(45) Date of Patent: Jul. 16, 2013

(54) STORAGE CONTROLLER AND STORAGE SUBSYSTEM WITH ADDED CONFIGURABLE FUNCTIONS

(75) Inventor: Kentaro Shimada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 648 days.

(21) Appl. No.: 12/681,852

(22) PCT Filed: Mar. 25, 2010

(86) PCT No.: PCT/JP2010/002130
§ 371 (c)(1),
(2), (4) Date: Apr. 6, 2010

(87) PCT Pub. No.: WO2011/117926
PCT Pub. Date: Sep. 29, 2011

(65) Prior Publication Data
US 2011/0271061 A1    Nov. 3, 2011

(51) Int. Cl.
*G06F 12/00* (2006.01)

(52) U.S. Cl.
USPC ............ 711/154; 710/22; 711/E12.019

(58) Field of Classification Search
USPC .... 711/154, 112, 114, 156, E12.019; 710/22, 710/33, 313
See application file for complete search history.

(56) References Cited

U.S. PATENT DOCUMENTS

| | | | |
|---|---|---|---|
| 6,684,268 B1 * | 1/2004 | Paluzzi | 710/33 |
| 6,820,171 B1 * | 11/2004 | Weber et al. | 711/114 |
| 7,124,245 B1 * | 10/2006 | Walton et al. | 711/113 |
| 7,353,496 B2 * | 4/2008 | Kimura et al. | 717/121 |
| 8,234,479 B2 * | 7/2012 | Jeddeloh et al. | 711/169 |
| 2006/0072580 A1 | 4/2006 | Dropps et al. | |
| 2006/0184760 A1 | 8/2006 | Fujibayashi et al. | |
| 2007/0171815 A1 | 7/2007 | Takeuchi et al. | |
| 2011/0252176 A1 * | 10/2011 | Tanaka et al. | 710/313 |

FOREIGN PATENT DOCUMENTS

JP    2006-244340    9/2006

* cited by examiner

*Primary Examiner* — Pierre-Michel Bataille
(74) *Attorney, Agent, or Firm* — Brundidge & Stanger, P.C.

(57) ABSTRACT

Some functions of multiple structural elements are integrated into a specific structural element. The specific structural element controls transmission/reception of signals to/from the respective structural elements. A storage controller includes a Frontend I/F (Interface) Chip, Backend I/F Chip, CPU (Central Processing Unit), memory, and universal LSI (Large Scale Integrated Circuit) connected to the respective units, and transmitting/receiving signals to/from the respective units. The universal LSI is configured by integrating functions of connecting and controlling the respective units, and when connecting to the respective units, the function blocks corresponding to the respective units are validated and become a Frontend control block, a Backend control block, a switch block, a CPU I/F block and a memory control block while the control functions which are not connected are invalidated. For the valid functions, signal transmission is performed with the outside of the LSI, whereas for invalid functions, signal transmission is blocked.

11 Claims, 23 Drawing Sheets

STORAGE CONTROLLER AND STORAGE SUBSYSTEM WITH ADDED CONFIGURABLE FUNCTIONS

TECHNICAL FIELD

This invention relates to a storage controller and a storage subsystem for controlling data input/output processing for storage devices such as hard disk drives.

BACKGROUND ART

Some storage subsystems or disk array systems include storage devices such as hard disk drives and storage controllers for controlling data input/output processing for the storage devices. As an example of this type of storage subsystem or disk array systems, one having host interfaces for transmitting/receiving information to/from host computers, hard disk drive interfaces for transmitting/receiving information to/from hard disk drives, processing units for processing data according to commands from the host computers, cache memories for temporarily storing data to be sent to/from the hard disk drives, and switches mutually connecting the respective units, in which these units are installed in dedicated packages respectively and each package is configured using a dedicated LSI (Large Scale Integrated circuit) (refer to Patent Literature 1) has been proposed.

If each unit in a storage subsystem is configured as a dedicated package, even in case the storage subsystem is made in a redundant configuration or the storage subsystem is made in a small-scale configuration, a medium-scale configuration, or a large-scale configuration, the storage subsystem can be configured according to the scale by adding dedicated packages.

CITATION LIST

Patent Literature

PTL 1: Japanese Unexamined Patent Application Publication No. 2006-244340

SUMMARY OF INVENTION

Technical Problem

In configuring a storage subsystem, using multiple types of packages and adopting a configuration where dedicated LSIs are installed in respective packages requires developing the multiple types of LSIs, which increases the cost including the development cost. Furthermore, even in case of configuring a small-scale storage subsystem, multiple types of packages are required and further, if the redundant configuration is adopted, the cost is increased accordingly.

Meanwhile, if a large-scale storage subsystem is configured and if multiple types of packages are added in accordance with the large-scale configuration, the functions which are necessary for a small-scale configuration but not necessary for a large-scale configuration might be added, and all the added packages cannot be utilized efficiently.

This invention has been devised in view of the problems described in the above-mentioned conventional technologies, and its purpose is, by integrating some functions of multiple structural elements into a specific structural element, to provide a storage control system and a storage subsystem in which the specific structural element can control transmission/reception of signals to/from the respective structural elements.

Solution to Problem

To achieve the above-mentioned purpose, this invention provides a storage controller including: first interface modules for transmitting/receiving information to/from host computers; second interface modules for transmitting/receiving information to/from storage devices; processing modules for processing data based on commands input by the host computers via the first interface modules; memory modules for temporarily storing data stored/fetched in/from the storage devices; and relay processing units connected to the first interface modules, the second interface modules, the processing modules, and the memory modules, respectively, wherein, the relay processing units, being specific structural elements, performing and controlling transmission/reception of signals to/from the other structural elements.

Advantageous Effects of Invention

According to this invention, whenever relay processing units are configured in accordance with the scale of the system, the development cost can be reduced because the relay processing units can be shared.

DESCRIPTION OF EMBODIMENTS

EXAMPLE 1

In this example, of structural elements configuring a storage controller, a universal LSI is regarded as a specific structural element while some functions of the other respective structural elements are integrated in the universal LSI, and the universal LSI controls transmission/reception of signals to/from the other structural elements. An embodiment of this invention is described below with reference to the figures.

Figure 1:
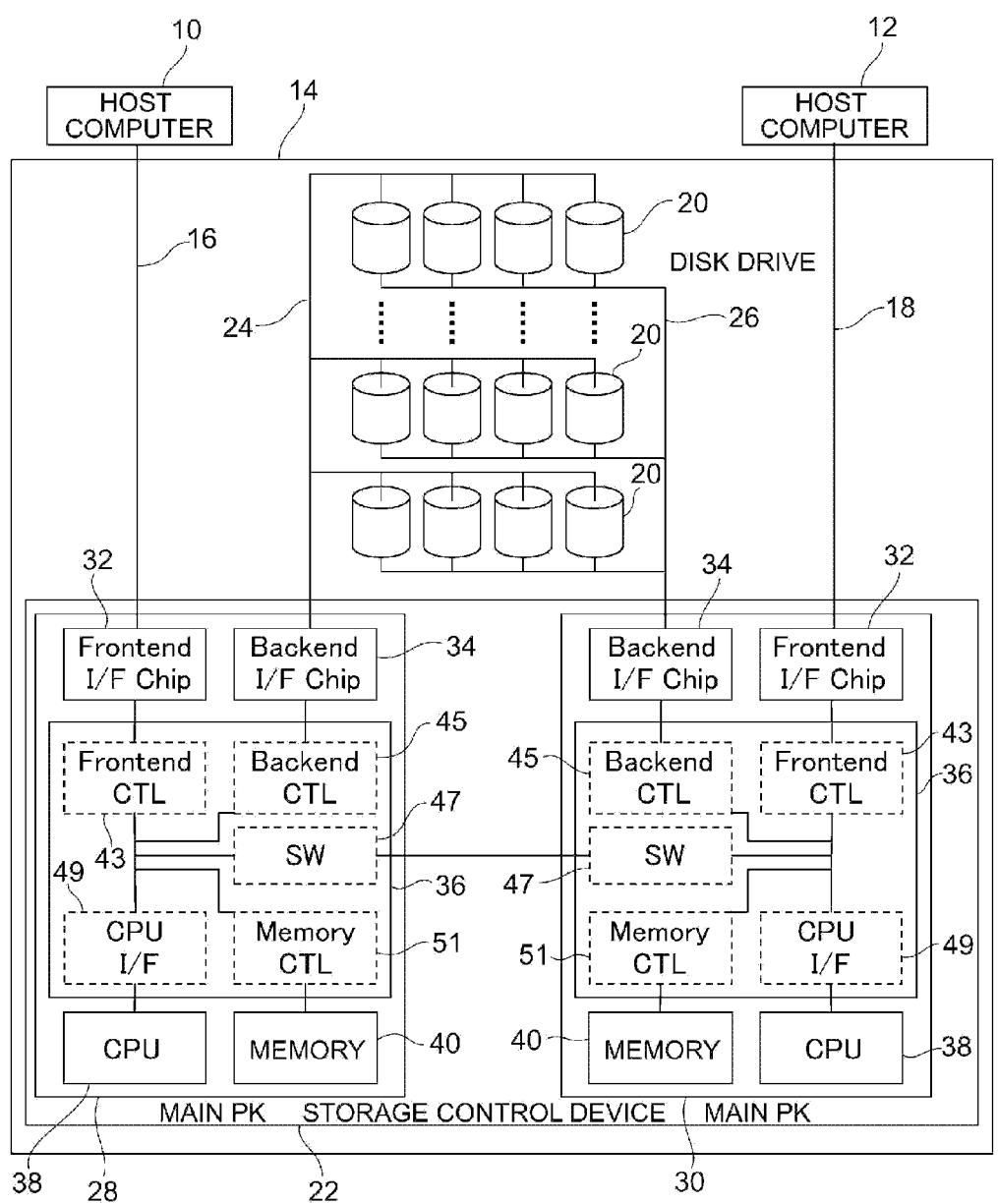
FIG. 1 is a block diagram of a storage system adopting this invention.

FIG. 1 is a block diagram of a storage system adopting this invention. In FIG. 1, the storage system includes multiple host computers 10, 12 and a storage subsystem (also referred to as a disk array system) 14, and the respective host computers 10, 12 are connected to the storage subsystem 14 via networks 16, 18. As the networks 16, 18, for example, FC (Fibre Channel) can be used.

The storage subsystem 14 includes multiple disk drives 20 and a storage controller (also referred to as a storage controller) 22, and the respective disk drives 20 are connected to the storage controller 22 via internal networks 24, 26. As the internal networks 24, 26, for example, SAS (Serial Attached SCSI(Small Computer System Interface)) can be used.

The multiple disk drives 20 are configured as storage devices including multiple HDDs (Hard Disk Drives) and, in the storage area of each disk drive 20, one or more virtual devices (logical devices) are configured.

The storage controller 22 includes main packages (MPKs) 28, 30, and each of the main packages 28, 30 is configured having a Frontend I/F (Interface) Chip 32, a Backend I/F Chip 34, a universal LSI 36, a CPU (Central Processing Unit) 38, and a memory (cache memory) 40.

The host computer 10, 12 includes a CPU, storage units, input/output units, display units (none of the above is shown in the figure), and the CPU, issues commands in accordance with programs stored in the storage units and controls the data input/output processing for the storage controller 22 and other types of processing. Note that, as one of the multiple host computers including the host computers 10, 12, the host computer 10 is referred to in the description below.

The Frontend I/F Chip 32 is configured as a first interface unit or a host interface performing transmission/reception of information to/from the host computer 10, and processes a communication procedure (protocol) for the communication with the host computer 10, for example, FC (Fibre Channel), to transmit/receive commands and data to/from the host computer 10.

The Backend I/F Chip 34 is configured as a second interface unit or an HDD interface unit performing transmission/reception of information to/from the respective disk drives 10, and processes the communication procedure (protocol) for the communication with the respective disk drives 20, for example, SAS, to perform the input/output processing of commands and data with the respective disk drives 20.

The CPU 38 is configured as a processing unit analyzing commands from the host computer 10, processing data based on this analysis result, and controlling the entire storage controller.

The memory 40 is configured as a memory module (cache memory) temporarily storing data to be sent/received to/from the respective disk drives 20.

The universal LSI 36 is connected to the Frontend I/F Chip 32, the Backend I/F Chip 34, the CPU 38, and the memory 40, and is configured as a relay processing unit performing transmission/reception of signals to/from the respective units.

In this case, the universal LSI 36 is configured with a semiconductor integrated circuit and includes multiple Frontend control blocks 43, multiple Backend control blocks 45, multiple switch blocks 47, multiple CPU I/F blocks 49, and multiple memory control blocks 51, as function blocks that are circuit blocks formed by hardware and performing transmission/reception of signals to/from the respective units including the Frontend I/F Chip 32, the Backend I/F Chip 34, the CPU 38, and the memory 40 and processing signals in accordance with the functions of the respective units.

That is, the universal LSI 36 is configured such that if, of the multiple structural elements configuring the storage controller 22, the universal LSI 36 is assumed to be a specific structural element, it controls transmission/reception of signals to/from the other multiple structural elements than the universal LSI 36 (the Frontend I/F Chip 32, the Backend I/F Chip 34, the CPU 38, and the memory 40). In this case, when the universal LSI 36 performs transmission/reception of signals to/from the other respective structural elements, it manages its functions to do so by validating or invalidating the functions of performing and controlling transmission/reception of signals to/from the other respective structural elements. That is, the Frontend control blocks 43, the Backend control blocks 45, the switch blocks 47, the CPU I/F blocks 49, and the memory control blocks 51 shown in FIG. 1 show that the respective functions are validated. This is described more specifically next in the examples of the universal LSI 36.

Figure 2:
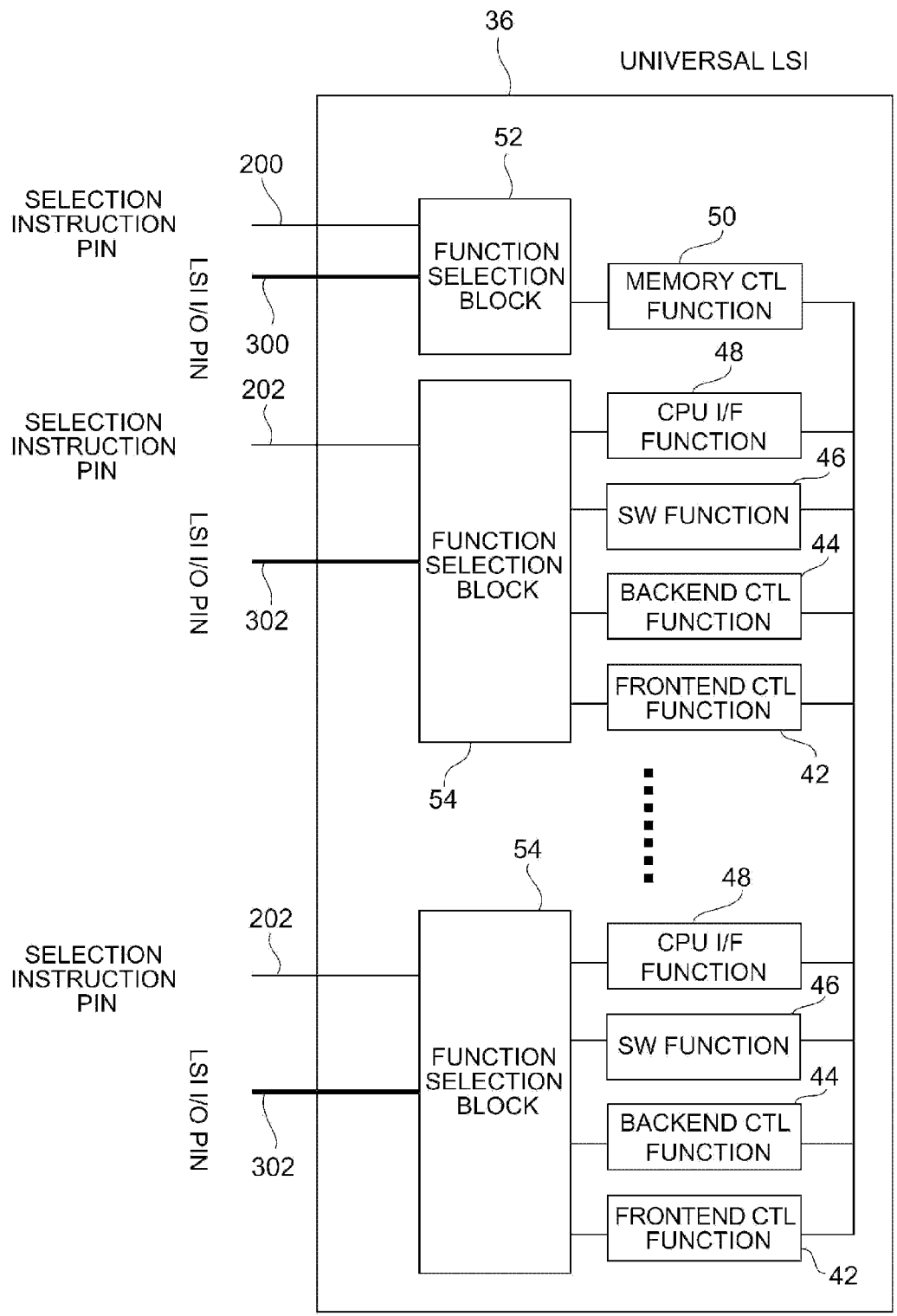
FIG. 2 is a block diagram showing the first example of a universal LSI.

Next, the first example of the universal LSI 36 is described with reference to FIG. 2.

The universal LSI 36 includes, in addition to the multiple function blocks (Frontend control function blocks 42, Backend control function blocks 44, switch function blocks 46, CPU I/F function blocks 48, and memory control function blocks 50) 42 to 50, a function selection block 52 for selecting the respective function blocks and multiple function selection blocks 54.

The Frontend control function block 42 is configured with a circuit block formed by hardware and connected to the Frontend I/F Chip 32, and has the functions of generating signals (the first control signals) for controlling the Frontend I/F Chip 32 and performing transmission/reception of the signals to/from the Frontend I/F Chip 32.

The Backend control function block 44 is configured with a circuit block formed by hardware, is connected to the Backend I/F Chip 34, and has the functions of generating signals (the second control signals) for controlling the Backend I/F Chip 34 and performing transmission/reception of the signals to/from the Backend I/F Chip 34.

The switch function block 46 is configured with a circuit block formed by hardware and has the functions of transmitting signals from the inside of the universal LSI 36, that is, signals from the respective function blocks, to the outside of the universal LSI 36, and transmitting signals from the outside of the universal LSI 36 to the inside of the universal LSI 36.

The CPU I/F function block 48 is configured with a circuit block formed by hardware, connected to the CPU 38, and has the functions of transmitting instructions from the CPU 38 to the function blocks designated by the instructions from among the other function blocks, and transmitting signals from the other function blocks to the CPU 38.

The memory control function block 50 is configured from a circuit block formed by hardware, connected to the memory 40, and has the functions of controlling the memory 40 and performing the data input/output processing for the memory 40.

Note that, when the respective disk drives 20 are configured to be multiple RAID (Redundant Array of Inexpensive Disks) groups, the RAID parity generation function and the data check function can be added to the respective memory control function blocks 50.

The respective Frontend control function blocks 42, Backend control function blocks 44, switch function blocks 46, and CPU I/F function blocks 48 can be connected to common physical LSI I/O pins used for I/O (Input/Output) serial interfaces such as PCI Express.

Meanwhile, the respective memory control function blocks 50 can be connected to dedicated physical LSI I/O pins for memory used for memories such as DDR (Double Data Rate) 3 SDRAM (Synchronous Dynamic Random Access Memory). Note that, if a memory connectable to PCI Express is used as a memory 40, the memory 40 can be connected to common physical LSI I/O pins used for I/O serial interfaces such as PCI Express as with the other function blocks.

The function selection block 52 is connected to the memory control function block 50 and also connected to a selection instruction pin 200 and a dedicated physical LSI I/O pin 30 for memory. To the selection instruction pin 200, a signal of a previously set pattern (a digital signal of "0" or "1") is inputted. The function selection block 52, when the memory control block 50 is selected according to the selection instruction signal (the signal "1" instructing to select the memory control block 50) input from the selection instruction pin 200, validates the memory control function block 50, and connects the memory control function block 50 to the memory 40 via the I/O pin 300.

The multiple function selection blocks 54 are connected to the CPU I/F function blocks 48, the switch function blocks 46, the Backend control function blocks 44, and the Frontend control function blocks 42, and also connected to the selection instruction pins 202 and the common physical LSI I/O pins 302.

To each of the selection instruction pins 202, a signal of a previously set pattern (a digital signal of "0" or "1") is inputted. Each of the multiple function selection blocks 54, in accordance with the selection instruction signal (the signal "1" instructing to select one of the function blocks) input from the selection instruction pin 202, selects one of the function blocks, validates the selected function block, and connects the function block to one of the Frontend I/F Chip 32, the Backend I/F Chip 34 and the CPU 38 via the I/O pin 302.

That is, the multiple function blocks are arranged by being divided into groups each including one or more function blocks; the function blocks belonging to one group are connected to the I/O pins 300, 302 via the function selection blocks 52, 54; and the function selection blocks 52, 54 are allocated on the signal transmission paths connecting the respective function blocks and the respective units in the universal LSI 36. Note that, when a signal "0" instructing not to select a function block is inputted to each of the selection instruction pins 200, 202, each of the function selection blocks 52, 54 invalidates each function block and blocks the connection between each function block and the outside of the universal LSI 36. Regarding the Frontend control block 43, the Backend control block 45, the switch block 47, the CPU I/F block 49, and the memory control block 51 shown in FIG. 1, each belongs to a group including one or more function blocks to which the function selection blocks 52 and 54 are connected and, for example, a Frontend control block 43 indicates that, in one of the groups of the function blocks configured with the Frontend control function block 42, the Backend function control block 44, the switch function block 46, and the CPU I/F function block 48 in FIG. 2, the Frontend control function block 42 has been selected and validated by the function selection block 54 and the other function blocks have been invalidated. Similarly, the Backend control block 45 shown in FIG. 1 indicates that, in one of the groups of the function blocks configured with the Frontend control function block 42, the Backend function control block 44, the switch function block 46, and the CPU I/F function block 48 in FIG. 2, the Backend control function block 44 has been selected and validated by the function selection block 54 and that the other function blocks has been invalided. The same applies to the other switch block 47 and the CPU I/F block 49. The memory control block 51 in FIG. 1 is a block configured with the memory control function block 50 and the function selection block 52 in FIG. 2 mutually connected, and indicates that the memory control function block 50 has been selected and validated by the function selection block 52.

Figure 3:
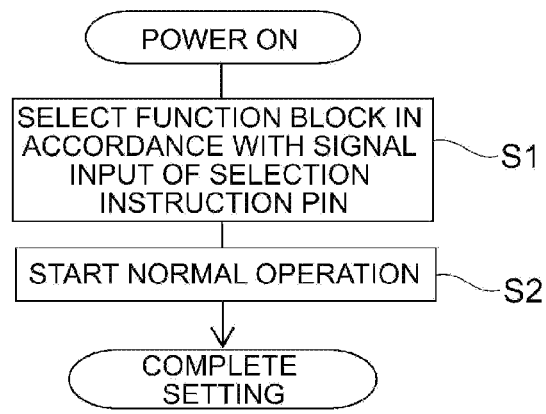
FIG. 3 is a flowchart for describing selection setting processing in the first example.

Next, the selection setting processing in the universal LSI 36 is described with reference to the flowchart of FIG. 3. Firstly, when the power is turned on, if a signal "1" instructing to select one of the function blocks is inputted from the selection instruction pin 200 or the selection instruction pin 202, each of the function selection blocks 52, 54 selects a function block in accordance with this signal input (S1), and starts the normal operation in the selected function block (S2).

For example, if the function selection block 52 selects the memory control function block 50 in accordance with the signal input, it connects the memory control function block 50 to the memory 40, and relays the data input/output processing for the memory 40. Meanwhile, if the function selection block 54 selects the Frontend control function block 42 in accordance with the signal input, it connects the Frontend control function block 42 to the Frontend I/F Chip 32, and performs the signal relay processing between the both of the above.

Figure 4:
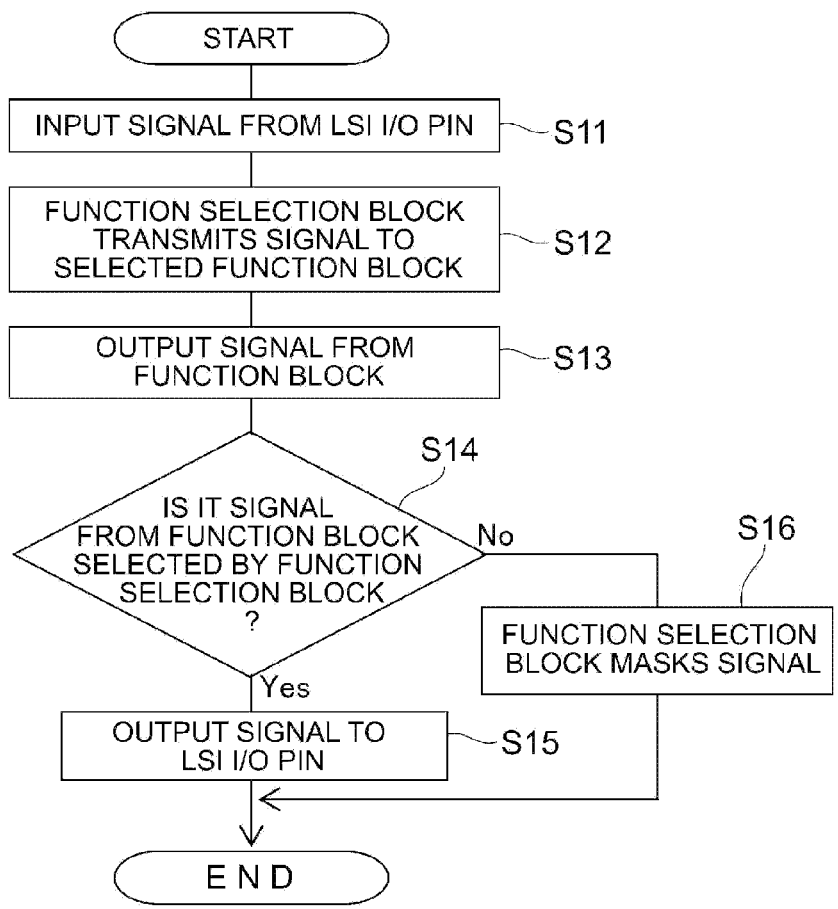
FIG. 4 is a flowchart for describing the method of signal transmission in a normal operation in the first example.

Next, the method of signal transmission in a normal operation in the universal LSI 36 is described with reference to the flowchart of FIG. 4. As an normal operation in the universal LSI 36, for example, if the function selection block 54 selected the Frontend control function block 42, the function selection block 54 receives a signal from the I/O pin 302 (S11), and transmits the input signal to the Frontend control function block 42 (S12).

Subsequently, the signal processed by the Frontend control function block 42 is output from the Frontend control function block 42 (S13).

Subsequently, the function selection block 54 determines whether or not the signal from the Frontend control function block 42 is the signal from the function block selected by the function selection block 54 and, if the signal is from the selected function block, outputs the signal from the Frontend control function block 42 to the I/O pin 302 (S15) while, if the signal is not from the selected function block, that is, the signal is from any of the other function blocks, for example, a signal from the Backend control function block 44, this signal is masked as the signal which should be excluded (S16). For example, the function selection block 54 blocks the connection to the Backend control function block 44, and terminates the processing of this routine. Note that, if the selected function block is the CPU I/F function block 48 and if an error signal accompanying the error processing by the CPU 38 is inputted from the CPU I/F function block 48, [this signal is,] not excluded even if it an error signal.

According to this example, it is possible to select only the required function blocks by inputting selection instruction signals from the selection instruction pins 200, 202 to the function selection blocks 52, 54, and the selected function blocks can be connected to the Frontend I/F Chip 32, the Backend I/F Chip 34, the CPU 38 and the memory 40 respectively. That is, only the function blocks selected by the respective function selection blocks 52, 54 are validated, accordingly, it is possible to efficiently utilize only the selected function blocks.

Furthermore, signals from the function blocks other than the function blocks selected by the respective function selection blocks 52, 54 are masked, accordingly, it is possible to prevent the signals from the function blocks other than the function blocks selected by the respective function selection blocks 52, 54 from being output to the Frontend I/F Chip 32, the Backend I/F Chip 34, CPU 38 or the memory 40.

EXAMPLE 2

Figure 5:
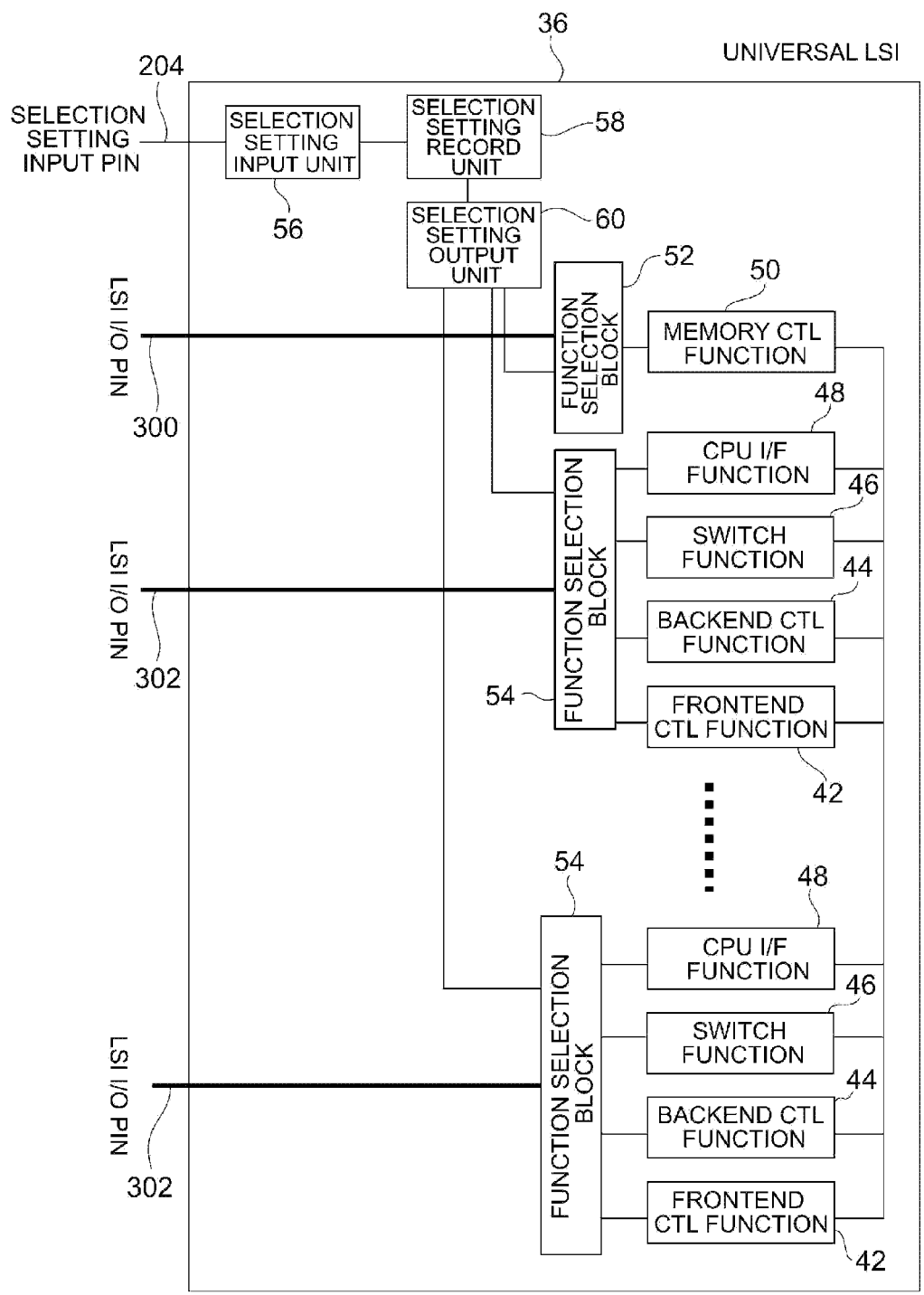
FIG. 5 is a block diagram showing the second example of a universal LSI.

Next, the second example of the universal LSI 36 is described with reference to FIG. 5.

The universal LSI 36 in this example uses a selection setting input pin 204 instead of selection instruction pin 200, 202 and provides, as selection setting blocks, a selection setting input unit 56, a selection setting record unit 58, and a selection setting output unit 60 between the selection setting input pin 204 and the function selection block 52, 54, while the remaining configuration is the same as in the first example.

The selection setting input pin 204 is, for example, connected to the CPU 38 or a signal generation circuit for use in setting (not shown in the figure) and a signal of a previously set pattern (a digital signal of "0" or "1") is inputted to the selection setting input pin 204. The selection setting input unit 56 receives a selection instruction signal from the selection setting input pin 204, and outputs the input selection instruction signal to the selection setting record unit 58. The selection setting record unit 58 records the input selection instruction signal as the function setting information, and outputs the selection instruction signal recorded as the function setting information to the selection setting output unit 60. The selection setting output unit 60 outputs the selection instruction signal from the selection setting record unit 58 to the function selection blocks 52, 54 respectively.

If a selection instruction signal of "1" instructing to select the memory control function block 50 is inputted from the selection setting output unit 60, the function selection block 52 selects the memory control function block 50 in accordance with the input selection instruction signal, meanwhile, if the selection instruction signal of "1" instructing to select one of the function blocks is inputted from the selection setting output unit 60, the function selection block 54 selects, in accordance with the input selection instruction signal, selects one function block from among the CPU I/F function block 48, the switch function block 46, the Backend control function block 44, or the Frontend control function block 42.

Figure 6:
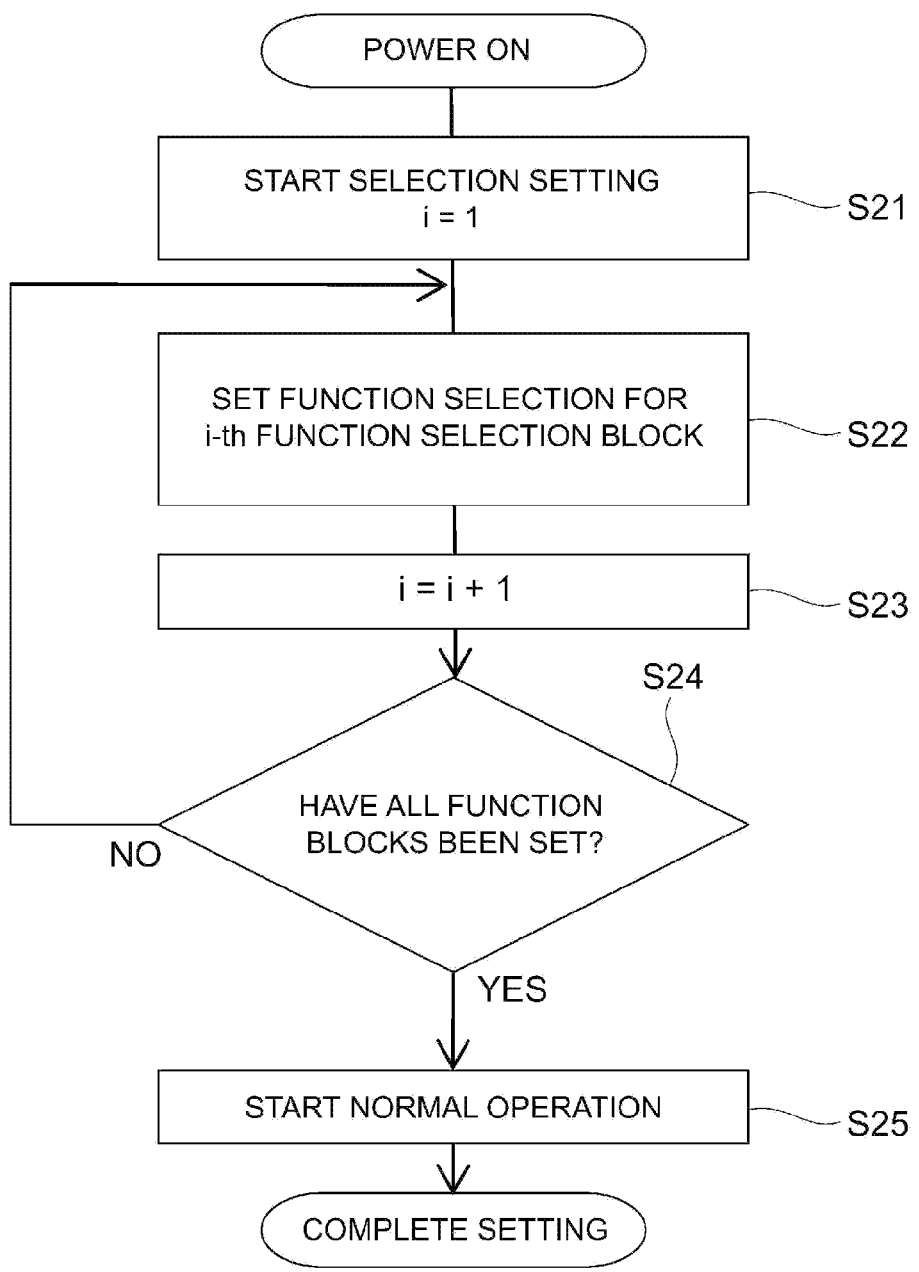
FIG. 6 is a flowchart for describing the selection setting processing in the second example.

Next, the selection setting processing by the selection setting output unit 60 is described with reference to the flowchart of FIG. 6.

Firstly, when the power is turned on, the selection setting output unit 60 starts the selection setting processing according to the selection instruction signal recorded in the selection setting record unit 58 and, for setting the i-th function selection block, sets i=1 (S21), and sets the function selection for the i-th function selection block (S22). For example, when the selection setting output unit 60 sets the function selection block 52 as the i-th function selection block, it outputs a signal for selecting the memory control function block 50 to the function selection block 52.

Then, the selection setting output unit 60 sets i=+1 (S23), determines whether or not the setting is complete for all the function selection blocks (S24) and, if the setting is not complete for all the function selection blocks, returns to step S22 and repeats the processing of steps S22 to S24 while, if the functions are set for all the function selection blocks, that is, if the function selection setting has been performed for all the function selection blocks 52, 54, [the unit] starts the normal operation (S25) and terminates the processing of this routine.

Figure 7:
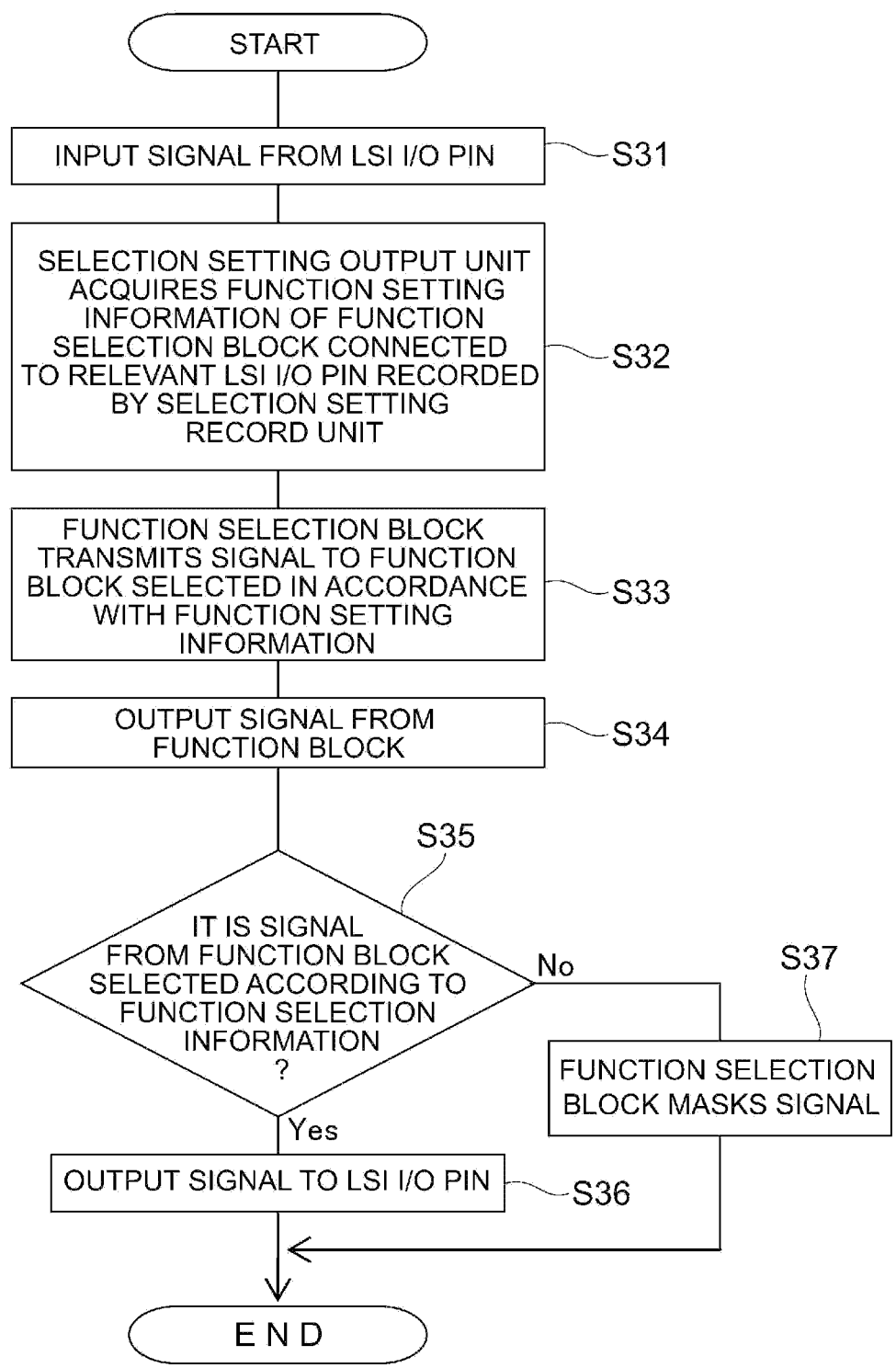
FIG. 7 is a flowchart for describing the method of signal transmission in a normal operation in the second example.

Next, the method of signal transmission in a normal operation is described with reference to the flowchart of FIG. 7. In a normal operation, for example, if the function selection block 54 selects the Frontend control function block 42, and when a selection instruction signal is inputted from the I/O pin 302, the function selection block 54 inputs this selection instruction signal (S31).

When a signal input occurs in the function selection block 54, in accordance with an instruction from the function selection block 54, the selection setting output unit 60 acquires function setting information recorded in the selection setting record unit 58 (S32), and outputs the acquired function setting information to the function selection block 54. If the acquired function setting information shows that the Frontend control function block 42 has been selected as the function block, the function selection block 54 selects the Frontend control function block 42 in accordance with the function setting information, and transmits the selection instruction signal from the I/O pin 302 to the Frontend control function block 42 (S33).

Subsequently, a signal processed by the Frontend control function block 42 is output from the Frontend control function block 42 (S34).

Then, the function selection block 54 determines whether or not the signal from the Frontend control function block 42 is the signal from the function block selected by the function setting information (S35) and, if the signal is from the function block selected by the function setting information, outputs the signal from the Frontend control function block 42 to the I/O pin 302 (S36). Meanwhile, the function selection block 54, if determining that the input signal is not from the function block selected by the function setting information, for example, if determining that the signal is from the Backend control function block 44, masks the signal from the Backend control function block 44 as the signal which should be excluded (S37). For example, the function selection block 54 blocks the connection to the Backend control function block 44, and terminates the processing of this routine.

According to this example, the function setting information is recorded in the selection setting record unit 58 and the recorded function setting information is output from the selection setting output unit 60 to the respective function selection blocks 52, 54, accordingly, it is possible to select only the required function blocks according to the function setting information and connect the selected function blocks to the Frontend I/F Chip 32, the Backend I/F Chip 34, the CPU 38 and the memory 40 respectively. That is, only the function blocks selected by the respective function selection blocks 52, 54 are validated according to the function setting information, accordingly, it is possible to efficiently utilize only the selected function blocks.

Furthermore, signals from the function blocks other than the function blocks selected by the respective function selection blocks 52, 54 are masked, accordingly, it is possible to prevent the signals from the function blocks other than the function blocks selected by the respective function selection blocks 52, 54 from being output to the Frontend I/F Chip 32, the Backend I/F Chip 34, CPU 38 or the memory 40 from the universal LSI 36 including the selection setting output unit 60 and others.

EXAMPLE 3

Figure 8:
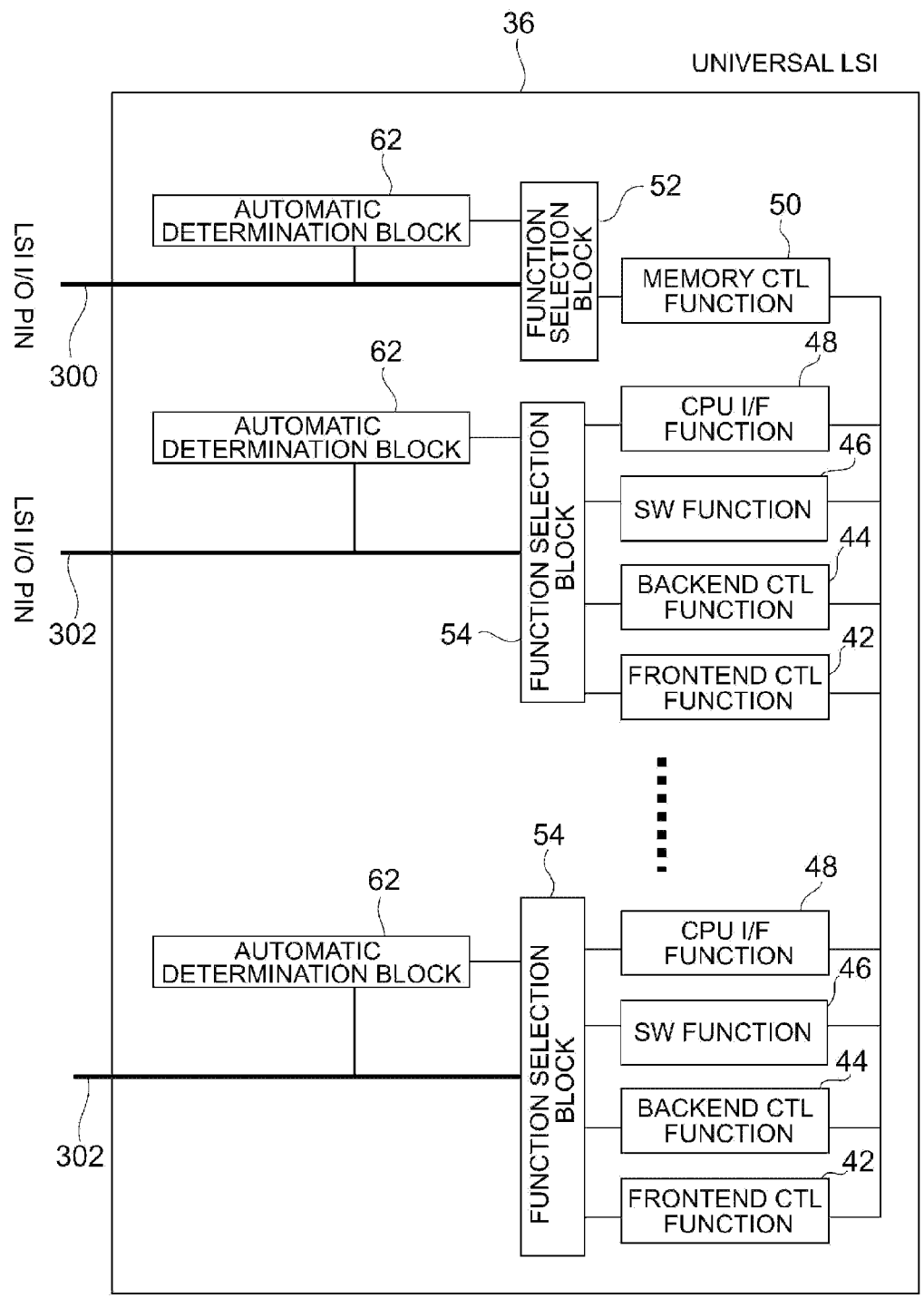
FIG. 8 is a block diagram showing the third example of a universal LSI.

Next, the third example of the universal LSI 36 is described with reference to the block diagram of FIG. 8.

In The universal LSI 36 in this example, multiple automatic determination blocks 62 are provided, in place of the selection instruction pin 202, to the function selection blocks 52, 54 respectively, and the remaining configuration is the same as in the first example.

Each of the automatic determination blocks 62 has a function of determining, based on the content of a signal transmitted through the I/O pin 300, 302 as the transmission path, whether or not the part connected to the I/O pin 300, 302 is, for example, any of the Frontend I/F Chip 32, the Backend I/F Chip 34, the CPU 38, or the memory 40, and outputting the signal according to this determination result to the function selection block 52, 54, and the respective function selection blocks 52, 54 can select one function blocks in accordance with the signals from the respective automatic determination blocks 62.

Figure 9:
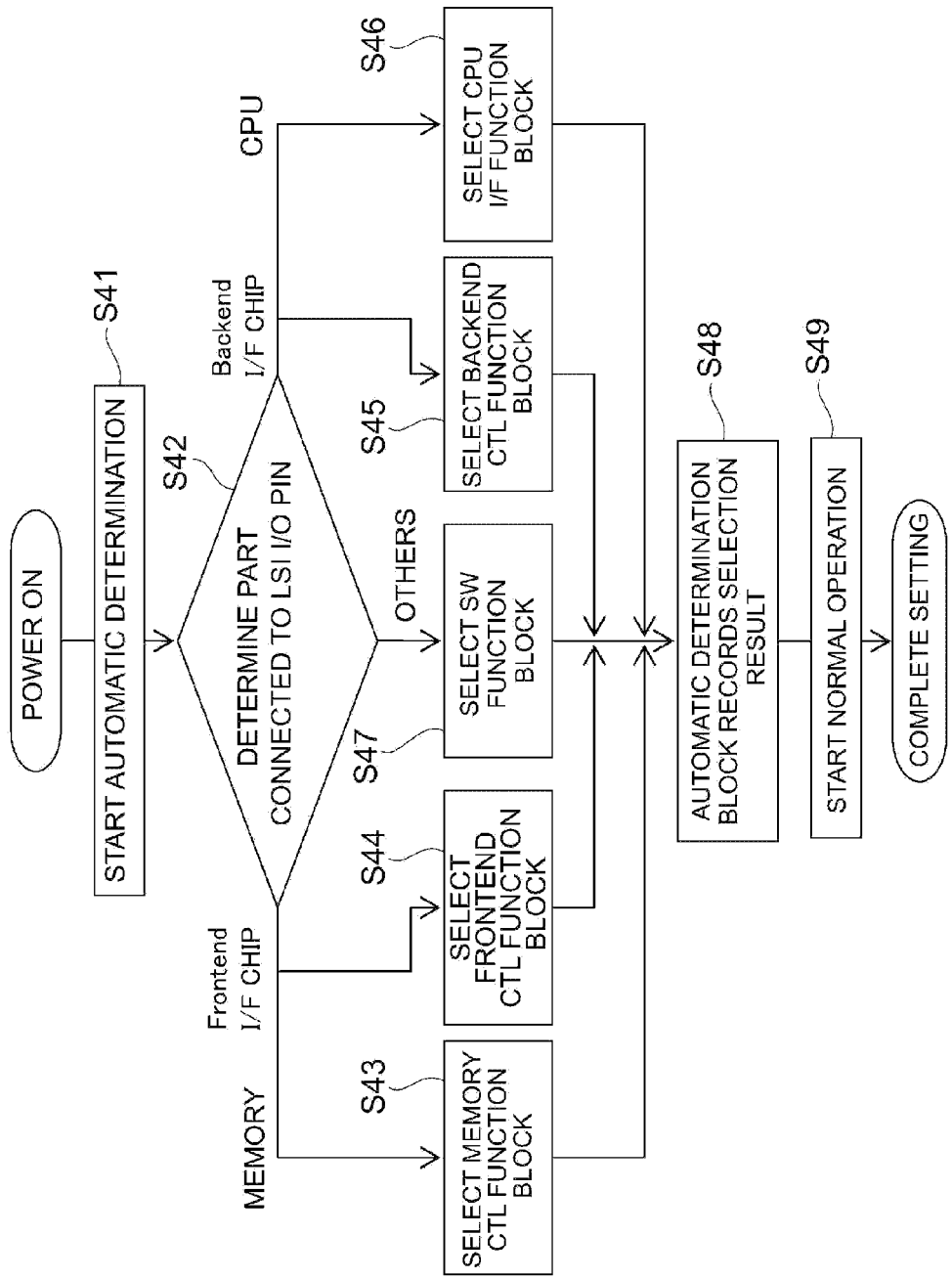
FIG. 9 is a flowchart for describing the selection setting processing in the third example.

Next, the selection setting processing by an automatic determination block 62 is described with reference to the flowchart of FIG. 9. Firstly, when the power is turned on, each of the automatic determination blocks 62 starts the automatic determination processing (S41), and determines the content of the signal transmitted on the I/O pin 300, 302 (S42).

Here, if each of the automatic determination block 62 determines that the part connected to the I/O pin 300 is the memory 40, it makes the function selection block 52 select the memory control function block 50 (S43); and, if the part connected to the I/O pin 302 is the Frontend I/F Chip 32, it makes the function selection block 54 select the Frontend control function block 42 (S44), or, if the part connected to the I/O pin 302 is the Backend I/F Chip 34, it makes the function selection block 54 select the Backend control function block 44 (S45), or, if the part connected to the I/O pin 302 is the CPU 38, it makes the function selection block 54 select the CPU I/F function block 48 (S46).

Meanwhile, if each automatic determination block 62 determines that the part connected to the I/O pin 302 is a part other than the above, because the part connected to the I/O pin 302 is a part inside the universal LSI 36, it makes the function selection block 54 select the switch function block 46 (S47).

Subsequently, the automatic determination block 62 records the selection result in the recording unit within the automatic determination block 62 (S48), then starts the normal operation (S49), and terminates the processing of this routine.

Figure 10:
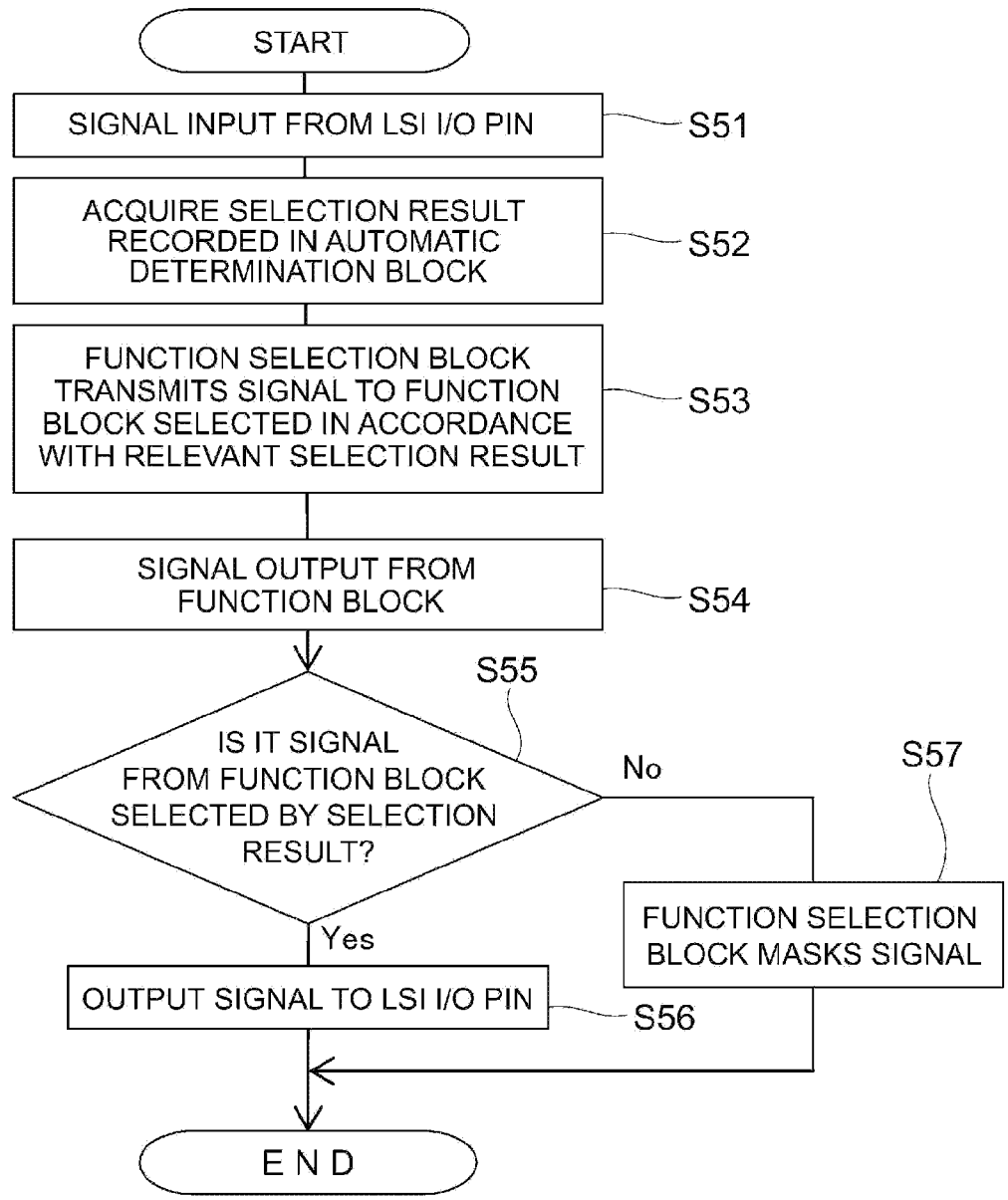
FIG. 10 is a flowchart for describing the method of signal transmission in a normal operation in the third example.

Next, the signal transmission processing in a normal operation is described with reference to the flowchart of FIG. 10. In the normal operation, for example, if the function selection block 54 has selected the Frontend control function block 42, when a signal is inputted from the I/O pin 302, the function selection block 54 receives this signal (S51).

When a signal input occurs in the function selection block 54, as instructed by the function selection block 54, the automatic determination block 62 acquires the selection result recorded in the record unit within the automatic determination block 62 (S52), and outputs the acquired selection result to the function selection block 54. If the acquired selection result shows that the Frontend control function block 42 has been selected as the function block, the function selection block 54 selects the Frontend control function block 42 in accordance with the selection result, and transmits the signal from the I/O pin 302 to the Frontend control function block 42 (S53).

Then, a signal processed by the Frontend control function block 42 is output from the Frontend control function block 42 (S54).

Then, the function selection block 54 determines whether or not the signal from the Frontend control function block 42 is a signal from the function block selected according to the selection result recorded in the recording unit within the automatic determination block 62 (S55) and, if the signal is from the function block selected according to the selection result, outputs the signal from the Frontend control function block 42 to the I/O pin 302 (S56). Meanwhile, if the function selection block 54 determines that the input signal is not from the function block selected according to the selection result, for example, if it determines that the signal is from the Backend control function block 44, it masks the signal from the Backend control function block 44 (S57), and terminates the processing of this routine.

According to this example, the respective automatic determination block 62s record determination results regarding the parts connected to the respective I/O pins 300, 302 and also selection results related to the function blocks selected by the respective function selection blocks 52, 54 according to the determination results, therefore, it is possible to automatically select function blocks corresponding to the parts connected to the respective I/O pins 300, 302 and connect the selected function blocks to the Frontend I/F Chip 32, the Backend I/F Chip 34, the CPU 38, and the memory 40 respectively. That is, only the function blocks automatically selected according to the selection results by the respective automatic determination blocks 62 are validated, accordingly, it is possible to efficiently utilize only the selected function blocks.

Furthermore, signals from the function blocks other than the function block selected in accordance with the selection results by the respective automatic determination blocks 62 are masked, therefore, it is possible to prevent the signals from the function blocks other than the function blocks selected in accordance with the selection results of the respective automatic determination blocks 62 from being output to the Frontend I/F Chip 32, the Backend I/F Chip 34, CPU 38 or the memory 40.

Figure 11:
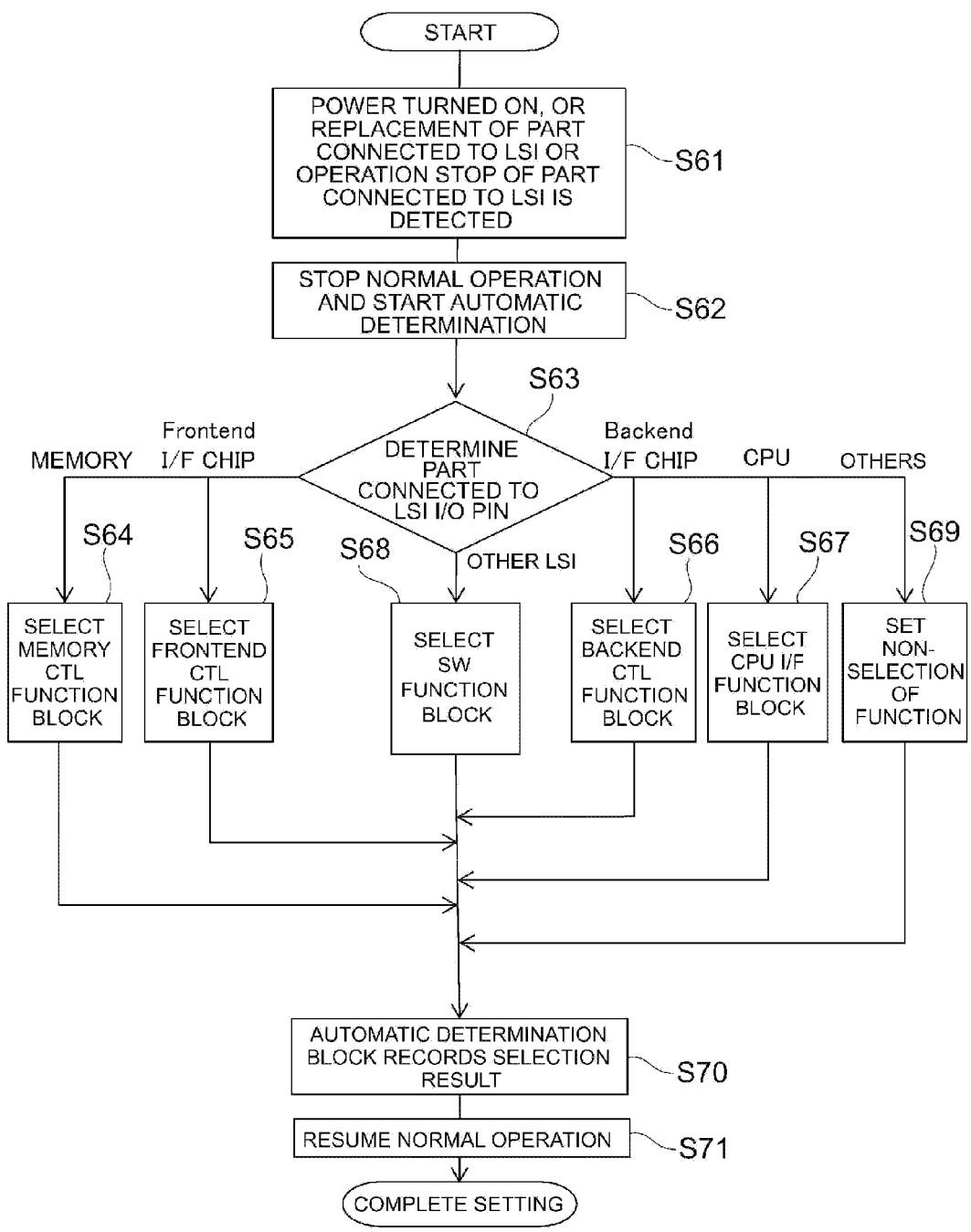
FIG. 11 is a flowchart for describing the selection setting processing including determination processing for operation stop at the time of a failure.

Next, the selection setting processing including determination processing for operation stop due to a failure of a part connected to the universal LSI 36 or other reasons is described with reference to the flowchart of FIG. 11. Firstly, when the power is turned on, or when the replacement of a part connected to the universal LSI 36 or the operation stop of a part is detected (S61), each automatic determination block 62 stops the normal operation and starts the automatic determination (S62).

Then, each automatic determination block 62 determines the part connected to the I/O pin 300, 302 (S63).

Here, if each automatic determination block 62 determines that the part connected to the I/O pin 300, 302 is the memory 40, it makes the function selection block 52 select the memory control function block 50 (S64), or, if the part connected to the I/O pin 300, 302 is the Frontend I/F Chip 32, it makes the function selection block 54 select the Frontend control function block 42 (S65), or, if the part connected to the I/O pin 300, 302 is the Backend I/F Chip 34, it makes the function selection block 54 select the Backend control function block 44 (S66), or, if the part connected to the I/O pin 300, 302 is the CPU 38, makes the function selection block 54 select the CPU I/F function block 48 (S67).

Meanwhile, if it is determined that the part connected to the I/O pin 300, 302 is another universal LSI 36, each of the automatic determination blocks 62 makes the function selection block 54 select the switch function block 46 (S68) or, in other cases, sets non-selection of a function (selection for invalidating function blocks) in the function selection block 52, 54 (S69).

Subsequently, each of the automatic determination blocks 62 records, in the recording unit within the automatic determination block 62, the selection result related to the function block selected by each of the function selection blocks 52, 54 (S70), then resumes the normal operation (S71), and terminates the processing of this routine.

Figure 12:
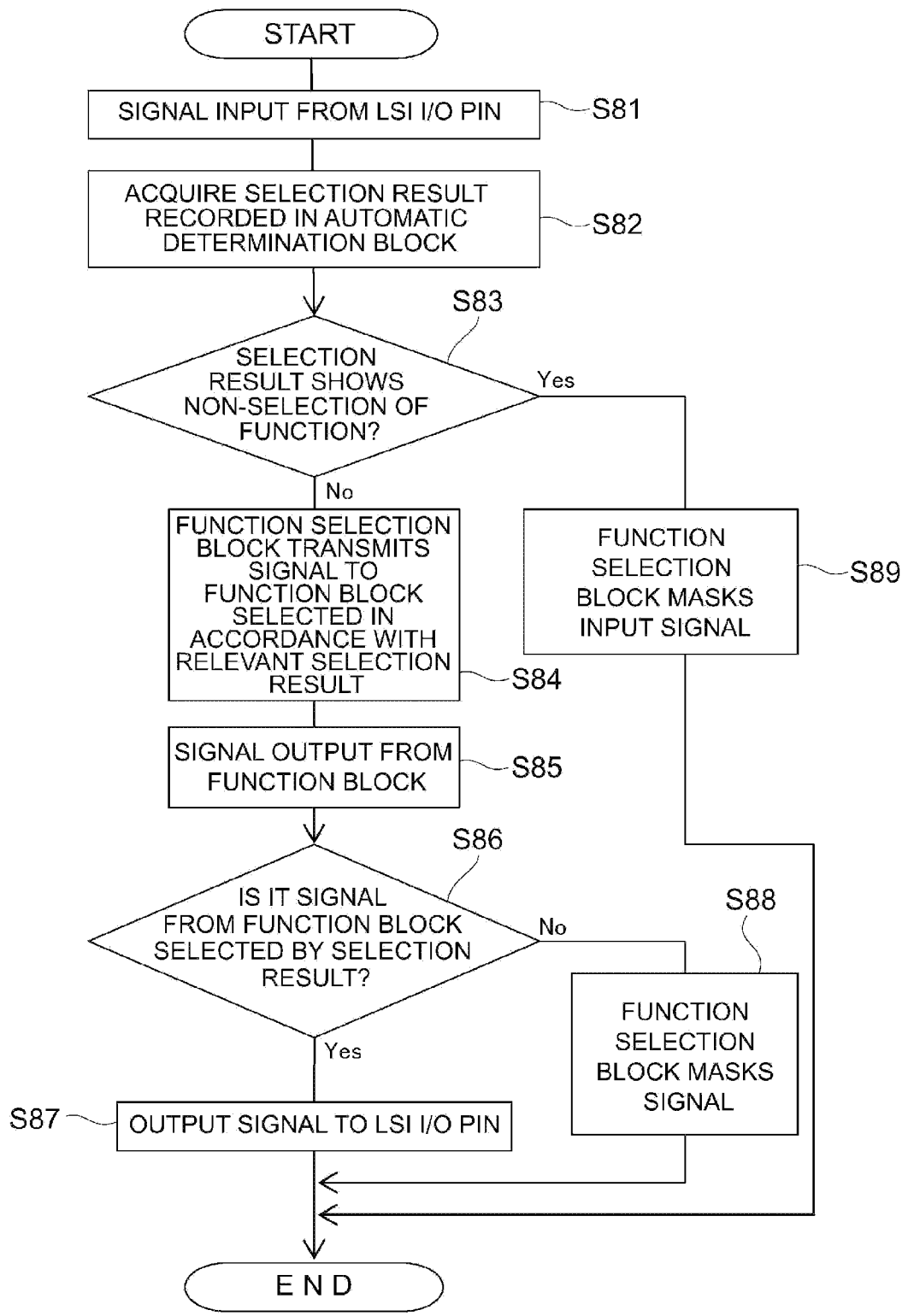
FIG. 12 is a flowchart for describing the method of signal transmission in a normal operation including a determination procedure for non-selection of a function.

Then, the signal transmission processing in a normal operation is described with reference to the flowchart of FIG. 12. For this processing, for example, a case where the function selection block 54 selects the Frontend control function block 42 is described. Firstly, when the function selection block 54 receives a signal from the I/O pin 302 (S81), the function selection block 54 acquires a selection result recorded in the automatic determination block 62 (S 82), and determines whether or not the acquired selection result is non-selection of a function (S83).

Here, if the function selection block 54 determines that the selection result is not non-selection of a function, it transmits the signal from the I/O pin 302 to the function block selected in accordance with the selection result, for example, the Frontend control function block 42 (S84).

Subsequently, the signal processed by the Frontend control function block 42 is output from the Frontend control function block 42 (S85).

Then, the function selection block 54 determines whether or not the signal from the Frontend control function block 42 is a signal from the function block selected according to the selection result, that is, the Frontend control function block 42 (S86) and, if it determines that the signal is from the Frontend control function block 42, it outputs the signal from the Frontend control function block 42 to the I/O pin 302 (S87), meanwhile if it determines that the signal is not from the Frontend control function block 42, for example, if it determines that the signal is from the Backend control function block 44, it masks the signal from the Backend control function block 44 (S88), and terminates the processing of this routine.

Meanwhile, in step S83, if it is determined that the selection result is non-selection of a function, the function selection block 54 regards none of the function blocks including the Frontend control function block 42 as the selected function block, masks an input signal input from the outside of the function block 54 (S89), and terminates the processing of this routine.

According to this example, signals from the function blocks other than the function blocks selected in accordance with the selection results by the respective automatic determination blocks 62 are masked, therefore, it is possible to prevent the signals from the function blocks other than the function blocks selected in accordance with the selection results by the respective automatic determination blocks 62 from being output from the universal LSI 36 including the automatic determination blocks 62 to the Frontend I/F Chip 32, the Backend I/F Chip 34, the CPU 38, or the memory 40 and, if the selection results by the respective automatic determination blocks 62 are non-selection of a function, input signals input from the outside of the function selection blocks 54 can be masked.

EXAMPLE 4

Figure 13:
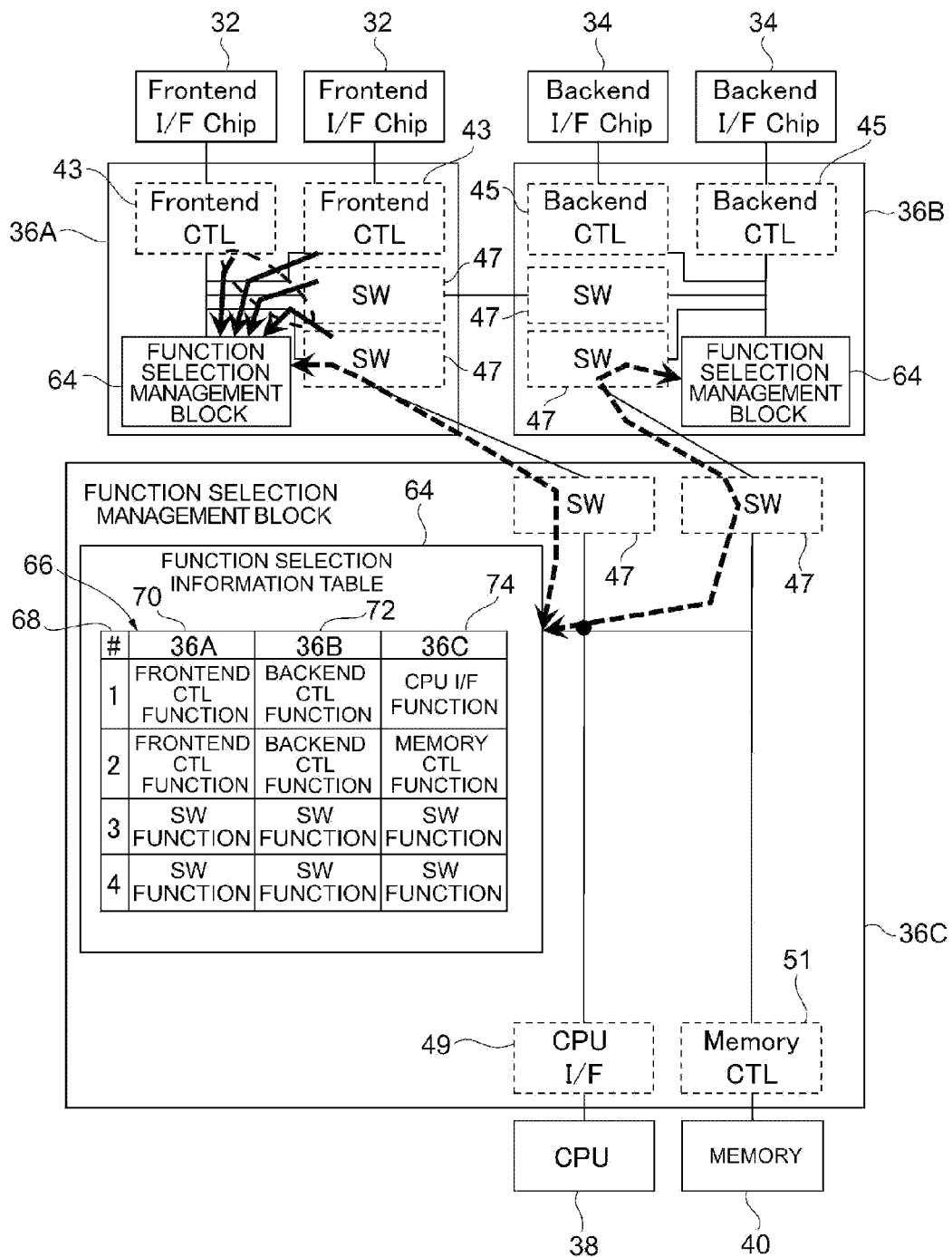
FIG. 13 is a block diagram showing the fourth example of a universal LSI.

Next, the fourth example of the universal LSI 36 is described with reference to the block diagram of FIG. 13.

In this example, three universal LSIs 36A, 36B, and 36C are each provided with a function selection management block 64, and the rest of the configuration is the same as any of the first to the third examples.

Each function selection management block 64 collects function selection information related to function blocks selected by function selection blocks 52, 54 in each universal LSI 36A, 36B, and 36C via the switch function block 46, records the collected function selection information in a function selection information table 66 as the function selection information for identifying the function blocks selected by the function selection blocks 52, 54, exchanges the information recorded in the function selection management block 66 with [the information recorded in] other function selection management blocks 66 via the switch function block 46, and registers and records the exchanged information in each function selection management block 64. Note that, in each of the universal LSIs 36A, 36B, and 36C, similar to those shown in FIG. 1, the Frontend control block 43, the Backend control block 45, the switch block 47, the CPU I/F block 49, and the memory control block 51 are either of the blocks, in a group including one or more function blocks shown in any of the first to the third examples, connected to the function selection block 52 or 54, the blocks connected to the selection setting input unit 56, the selection setting record unit 58, and the selection setting output unit 60, or the blocks connected to the automatic determination blocks 62. Each Frontend control block 43 shows that, of one or more function blocks, the Frontend control function block 42 is validated, the Backend control block 45 shows that the Backend control function block 44 is validated, the switch block 47 shows that the switch function block 46 is validated, the CPU I/F block 49 shows that the CPU I/F function block 48 is validated, and the memory control block 51 shows that the memory control function block 50 is validated.

The function selection information table 66 consists of function selection block numbers 68, and universal LSI identification numbers 70, 72, and 74. As the entries for the identification number 70, the information related to the Frontend control blocks 43 and the switch blocks 47 are stored as the function selection information selected in the universal LSI 36A and, as the entries for the identification number 72, the information related to the Backend control blocks 45 and the switch blocks 47 are stored as the function selection information selected in the universal LSI 36B and, as the entries for the identification number 74, the information related to the CPU I/F blocks 49, the memory control blocks 51 and the switch blocks 47 are stored as the function selection information selected in the universal LSI 36C.

According to this example, a function selection management block 64 is provided in each of the universal LSIs 36A, 36B, and 36C and function selection information selected in the respective universal LSIs is recorded in the respective function selection information tables 36, accordingly, the CPU 38 can collect the information in the respective function selection information tables 66 via the CPU I/F block 49.

Consequently, the CPU 38 can collect the information indicating which parts are connected to the universal LSIs 36A, 36B, and 36C, therefore, it can create configuration information for the entire system and thereby achieving efficient processing.

Meanwhile, it is also possible for the CPU 38 to utilize an arbitrary function block without designating a block. For example, when the CPU 38 issues, without designating a specific Frontend control block 43, a command to use an arbitrary Frontend control function block 42, any of the universal LSIs 36A, 36B, and 36C which has received this command can refer to the function selection information table 66, select an appropriate Frontend control block 43 according to this reference result, and transfer the command to the universal LSI 36 where the selected Frontend control block 43 exists. Therefore, the CPU 38 can utilize an arbitrary function block without designating a certain function block, thereby achieving efficient processing.

Furthermore, where automatic determination blocks 62 are used, if, for example, a function block which is not operating due to a failure or other reasons exists, a relevant function determination block 62 identifies the function block not operating due to a failure or other reasons, thereby avoiding the function block not operating due to the failure and automatically select a normally operating function selection block.

Figure 14:
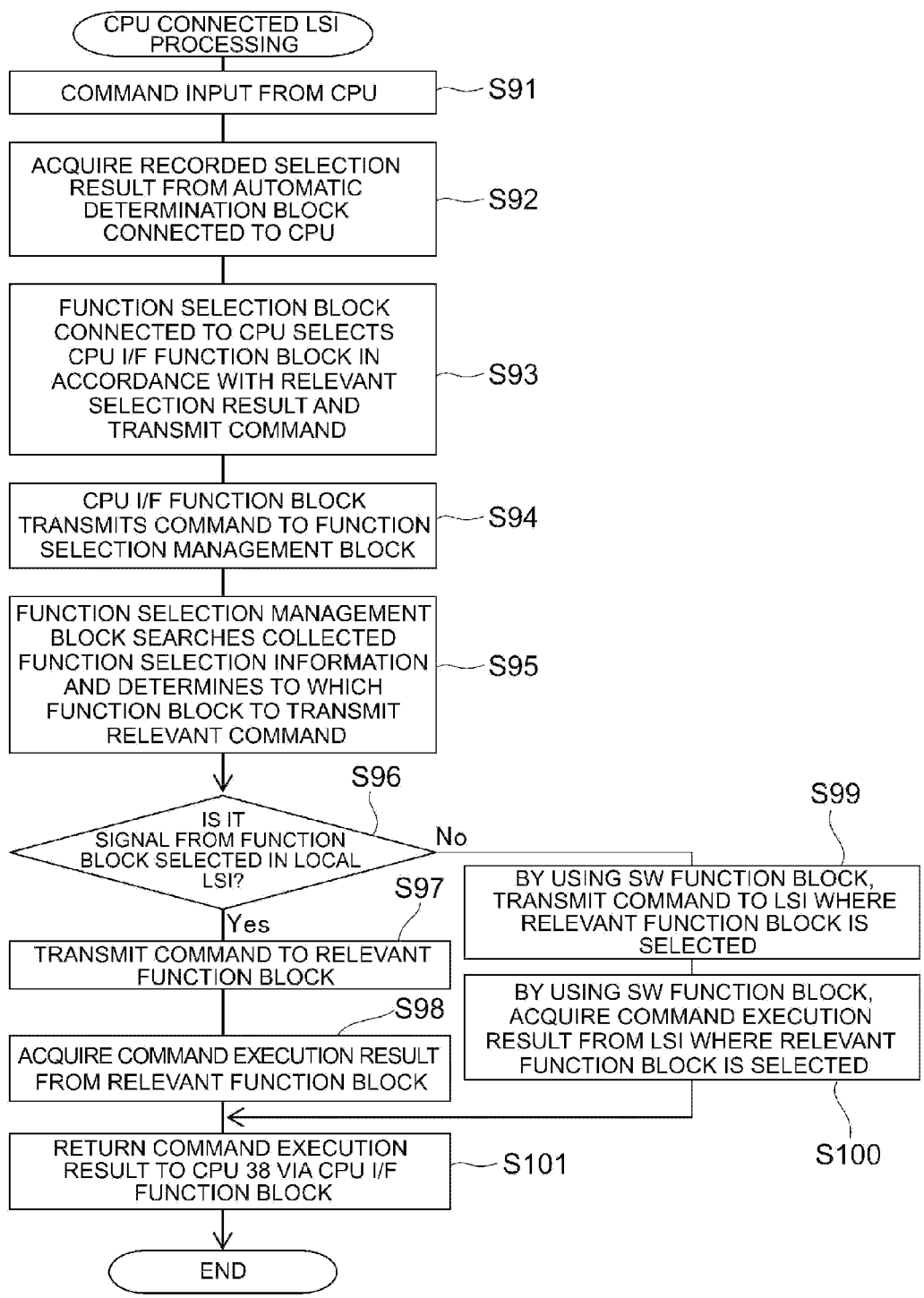
FIG. 14 is a flowchart for describing CPU connection processing in the fourth example.

Next, the processing for the CPU 38 to utilize an arbitrary function block without designating where the function block exists is described with reference to the flowchart of FIG. 14.

Firstly, when a command to utilize, for example, the Frontend control function blocks 42 as an arbitrary function block is issued from the CPU 38 to the respective universal LSIs 36A, 36B, and 36C, this command is inputted to the universal LSIs 36C (S91).

Then, in each of the universal LSIs 36C, of the function selection blocks 52, 54, the function selection block 54 connected to the CPU 38 via the I/O pin 302 acquires, as a selection result recorded in the recording unit within the automatic determination block 62, selection result for selecting the function block connected to the CPU 38 (S92), selects the CPU I/F function block 48 in accordance with the acquired selection result, and transmits the command to the selected CPU I/F function block 48 (S93).

The CPU I/F function block 48 which has received the command transmits the command to the function selection management block 64 (S94).

Then, the function selection management block 64 searches, based on the input command, the function selection information of the function selection information table 66 and, in accordance with this search, performs the processing for determining where to transmit the command (S95).

For determining where to transmit the command, the function selection management block 64, determines, based on the function selection information recorded in the function selection information table 66, whether or not the command must be transmitted to the function block selected in the local universal LSI (S96) and, if it is determined that the command must be transmitted to the function block in the local universal LSI, for example, transmits the command to the Frontend control block 43 (S97), then, acquires, from the Frontend control block 43 to which the command was transmitted. the command execution result (S98), and proceeds to the processing of step S101.

Meanwhile, if it is determined that the command must be transmitted outside of the local universal LSI, the function selection management block 64 transmits the command to another universal LSI using the switch block 47 (S99).

Then, the function selection management block 64 enters a waiting status for waiting for the command execution result to be transferred from the other universal LSI. Subsequently, when the command execution result is transferred from the other universal LSI, the function selection management block 64 acquires, using the switch block 47, the command execution result from the other universal LSI (S100), then, via the CPU I/F block 49, returns the command execution result to the CPU 38 (S101), and terminates the processing of this routine.

Figure 15:
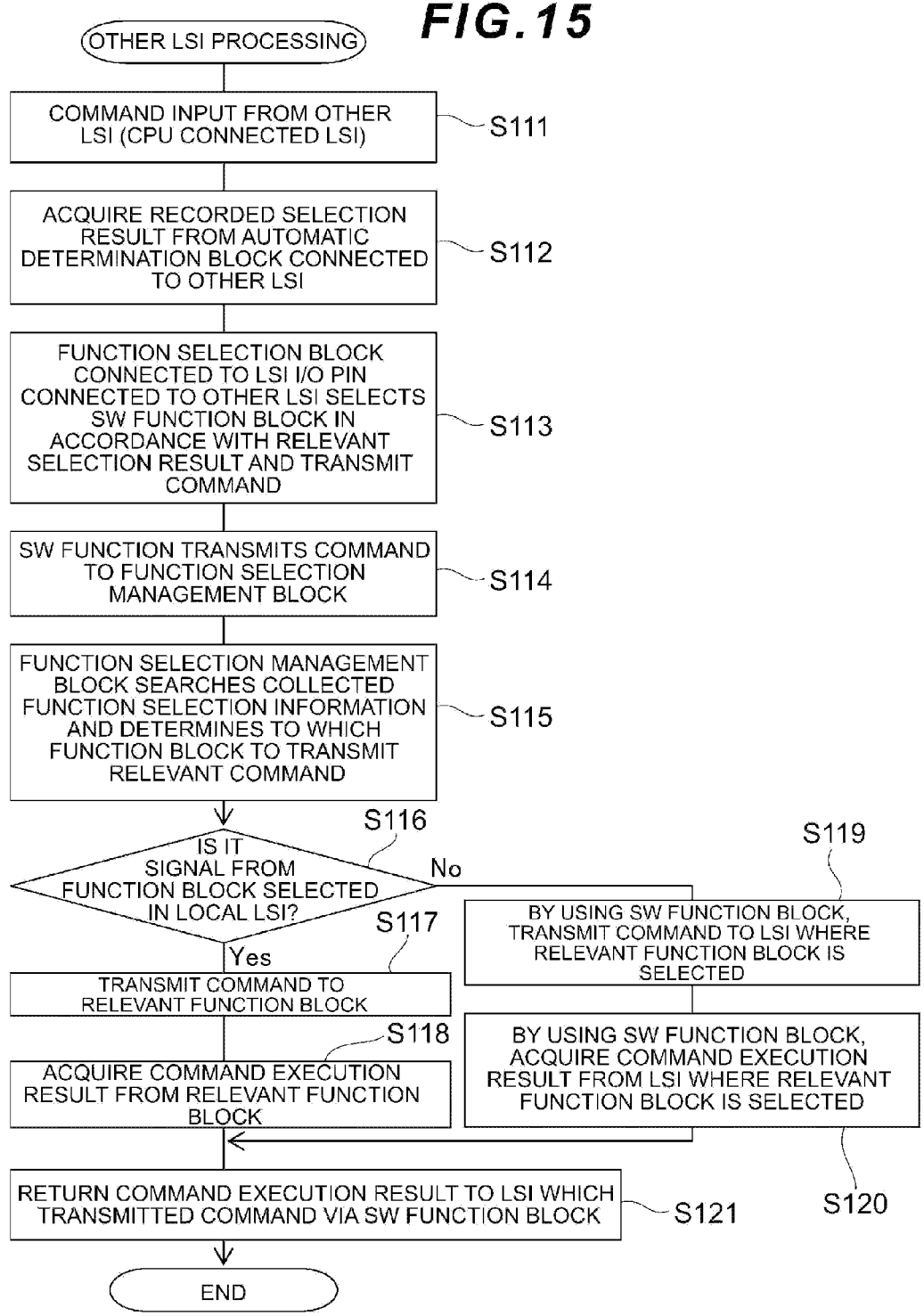
FIG. 15 is a flowchart for describing the processing for another universal LSI in the fourth example.

Next, the processing in the other universal LSI is described with reference to the flowchart of FIG. 15. Firstly, in step S99 of FIG. 14, if the command is transmitted from the other universal LSI, for example, the universal LSI 36C to the universal LSI 36B, the universal LSI 36B receives, via the switch block 47, the command from the universal LSI 36C (S111).

Subsequently, of the function selection blocks 52, 54 in the universal LSI 36B, the function selection block 54 connected to the universal LSI 36C via the I/O pin 302 acquires, as the selection result recorded in the recording unit within the automatic determination block 62, the selection result for selecting the function block for connection with the switch block 47 in the universal LSI 36C (S112), selects the switch function block 46 in accordance with the acquired selection result, and transmits the command to the selected switch function block 46 (S113).

The switch function block 46 having received the command transmits the command to the function selection management block 64 (S114).

Then, the function selection management block 64 searches the function selection information in the function selection information table 66 based on the input command, and, in accordance with this search, performs the processing for determining where to transmit the command (S115).

For determining where to transmit the command, the function selection management block 64 determines, based on the function selection information recorded in the function selection information table 66, whether or not the command must be transmitted to the function block selected within the local universal LSI (S116) and, if it is determined that the command must be transmitted to the function block in the local universal LSI transmits the command to, for example, the Frontend control block 43 (S117), then acquires the command execution result from the Frontend control block 43 to which the command was transmitted (S118), and proceeds to the processing of step S121.

Meanwhile, if it is determined that the command must be transmitted outside of the local universal LSI, the function selection management block 64 transmits the command to another universal LSI, for example, the universal LSI 36A using the switch block 47 (S119).

Then, the function selection management block 64 enters the waiting status in which the block waits for the command execution result to be transferred from the other universal LSI. Subsequently, when the command execution result is transferred from the other universal LSI, the function selection management block 64 acquires, using the switch block 47, the command execution result from the other universal LSI (S120), then returns the command execution result to the universal LSI which transmitted the command, for example, the universal LSI 36C via the switch block 47 (S121), and terminates the processing of this routine.

Figure 16:
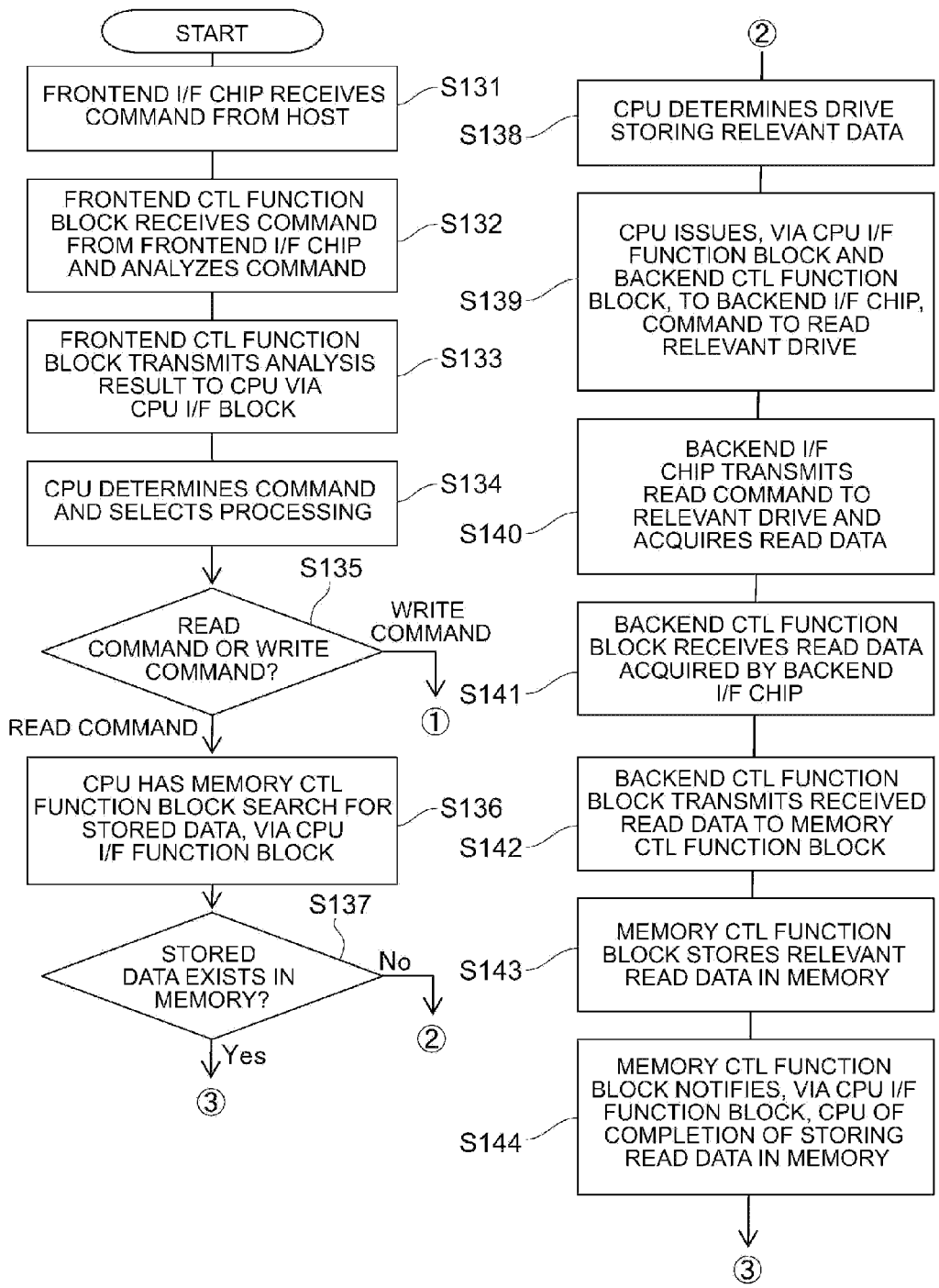
FIG. 16 is a flowchart for describing the operation of the storage system shown in FIG. 1.
Figure 17:
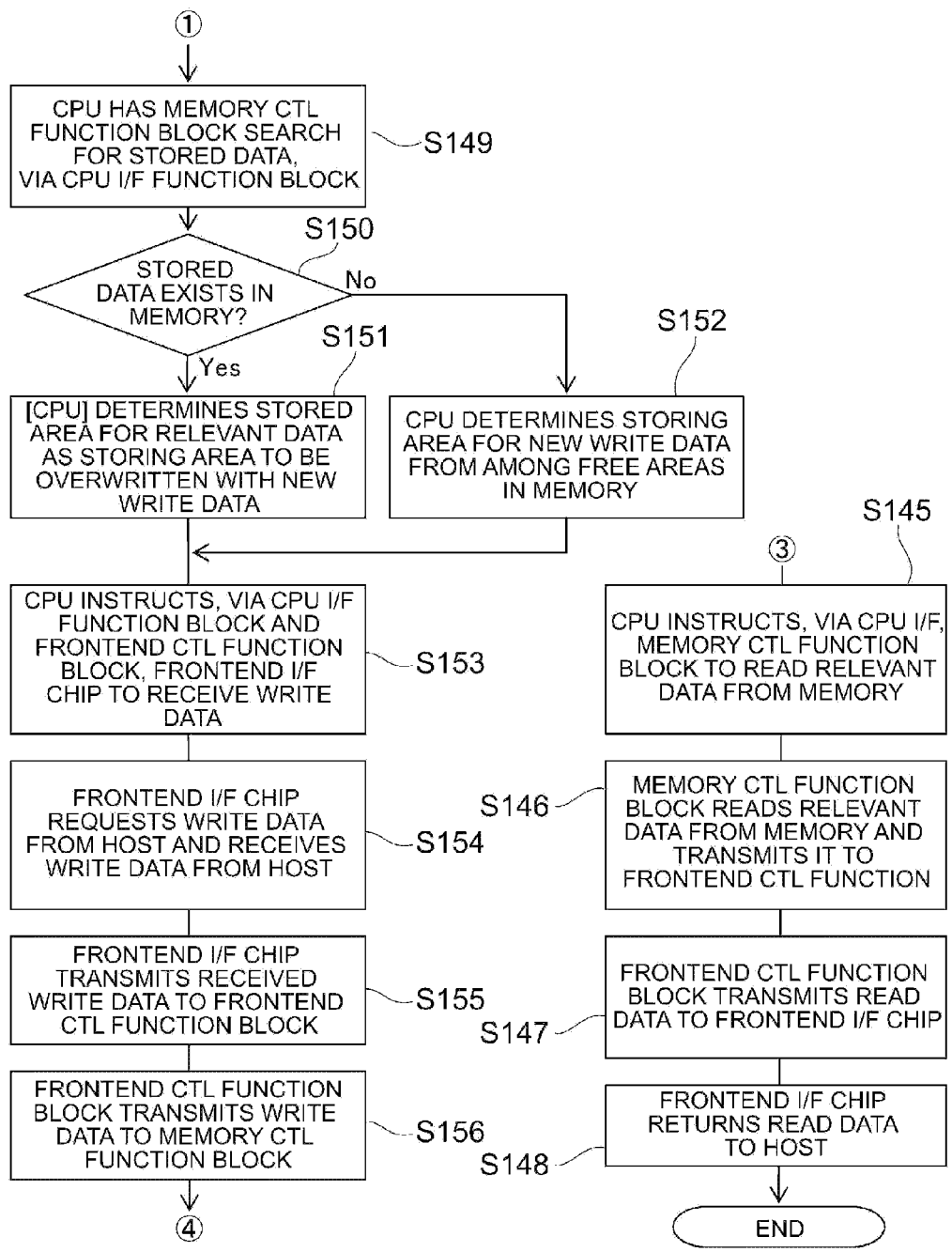
FIG. 17 is a flowchart for describing the operation of the storage system shown in FIG. 1.
Figure 18:
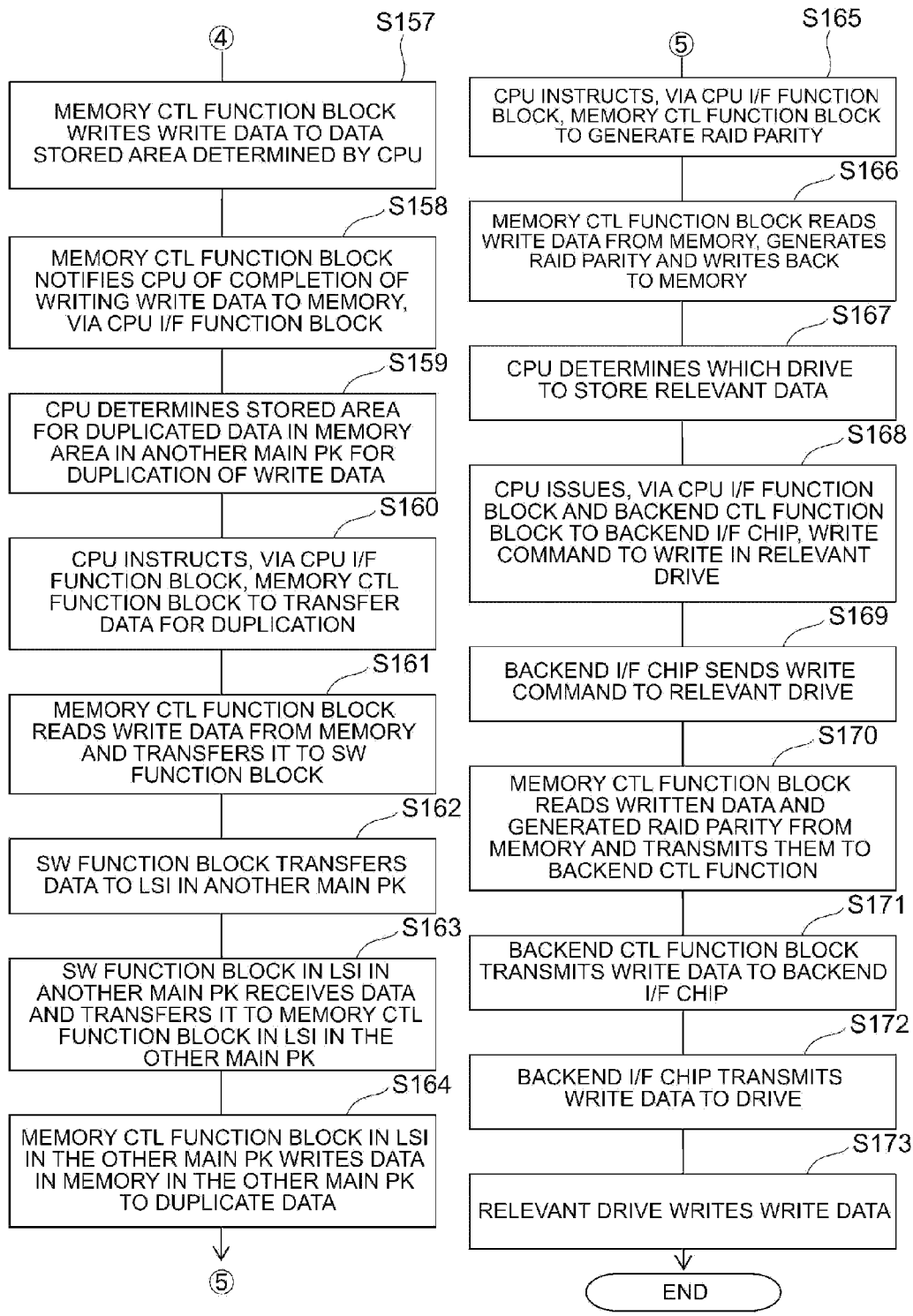
FIG. 18 is a flowchart for describing the operation of the storage system shown in FIG. 1.

Next, the processing in the storage subsystem 14 shown in FIG. 1 is described with reference to the flowcharts in FIG. 16 to FIG. 18.

Firstly, when the host computer 10 issues a command, the Frontend I/F Chip 32 receives the command (S31), the Frontend I/F Chip 32 transfers the command it received to the Frontend control block 43, and the Frontend control block 43 analyzes the command it received (S132).

The Frontend control block 43 transmits the analysis result of the command to the CPU 38 via the CPU I/F block 49 (S133). The CPU 38 determines the analysis result of the command, selects the processing based on this analysis result (S134), and determines whether the command is a read command or a write command (S135).

If the CPU 38 determines in step S135 that the command is a write command, it proceeds to the processing of step S149, meanwhile, if it determines that the command is a read command, it instructs, via the CPU I/F block 49, the memory control block 51 to perform the processing for the read command. The memory control block 51 searches for store data in the memory 40 in accordance with the read command (S136) and transfers the search result to the CPU 38 via the CPU I/F block 49.

The CPU 38 determines, based on the search result by the memory control block 51, whether or not any stored data exists in the memory 40 (S137). If the CPU 38 determines that stored data exists in the memory 22, it proceeds to the processing of step S145, meanwhile, if it determines that no stored data exists in the memory 22, it determines the disk drive 20 storing the data (S138) and issues a command to read the disk drive 20 to the Backend I/F Chip 34 via the CPU I/F block 49 and the Backend control block 45 (S139).

Here, the Backend I/F Chip 34 transmits a command to read the disk drive 20 designated by the command to the disk drive 20, acquires the read data from the disk drive 20 (S140), and transmits the acquired read data to the Backend control block 45.

The Backend control block 45 receives the read data transmitted from the Backend I/F Chip 34 (S141), and transmits the read data it received to the memory control block 51 (S142). The memory control block 51 stores the read data it received in the memory 40 (S143) and notifies, via the CPU I/F block 49, the CPU 38 of the completion of storing the read data in the memory (S144).

Then, the CPU 38 instructs, via the CPU I/F block 49, the memory control block 51 to read the data designated by the read command from the memory 40 (S145).

Subsequently, the memory control block 51 reads the data designated by the CPU 38 from the memory 40, and transmits the read data to the Frontend control block 43 (S146).

The Frontend control block 43 transmits the read data to the Frontend I/F Chip 32 (S147), and the Frontend I/F Chip 32 returns the read data to the host computer 10 (S148), and terminates the processing for the read command.

Meanwhile, if the CPU 38 determines in step S135 that the command is a write command, it instructs, via the CPU I/F block 49, the memory control block 51 to search for stored data in the memory 40. The memory control block 51 searches for stored data in the memory 40 according to the instruction, and returns the search result to the CPU 38 via the CPU I/F block 49 (S149).

The CPU 38 determines whether or not any stored data exists in the memory 40 based on the search result by the memory control block 51, (S150).

If the CPU 38 determines that stored data exists in the memory 40, it determines the stored area of the data as a storing area to be overwritten with new write data (S151) and proceeds to the processing of step S153, meanwhile, if it determines that no stored data exists in the memory 40, it determines a new write data storing area from among unused areas in the memory 40 (S152) and proceeds to the processing of step S153.

In step S153, the CPU 38, via the CPU I/F block 49 and Frontend control block 43, instructs the Frontend I/F Chip 32 to receive the write data (S153) and the Frontend I/F Chip 32 requests the host computer 10 to transmit the write data and receives the write data transmitted from the host computer 10 (S154).

Then, the Frontend I/F Chip 32 transmits the write data it received to the Frontend control block 43 (S155), and the Frontend control block 43 transmits the write data to the memory control block 51 (S156).

Then, the memory control block 51 writes the write data to the data storing area determined by the CPU 38 (S157) and notifies, via the CPU I/F block 49, the CPU 38 of the completion of writing the write data to the memory (S158).

Then, for the duplication of the write data, the CPU 38 determines a storing area for duplicated data in the memory area of another main package 30 (S159) and, based on this determination, instructs, via the CPU I/F block 49, the memory control block 51 to transfer the data for duplication (S160).

The memory control block 51 having received the instruction from the CPU 30 reads the write data from the memory 40 and transfers the read data to the switch block 47 (S161), and the switch block 47 transfers the data to a universal LSI in another main package 30 (S162).

Having received the write data, the switch block 47 in the other main package 30 transfers the data it received to the memory control block 51 in the main package 30 (S163), and the memory control block 51 having received the data duplicates the write data by writing the data to the memory 40 in the main package 30 (S164).

Then, the CPU 38 instructs, via the CPU I/F block 49, the memory control block 51 to generate a RAID parity (S165), and the memory control block 51 reads the write data from the memory 40, generates a RAID parity based on the read data, and writes the generated RAID parity back to the memory 40 (S166).

Then, the CPU 38 determines the disk drive 20 for storing the write data (S167) and, based on this determination, issues a write command to write to the determined disk drive 20 to the Backend I/F Chip 34 via the CPU I/F block 49 and the Backend control block 45 (S168). The Backend I/F Chip 34 having received the write command transmits the write command to the disk drive 20 determined by the CPU 38 (S169).

Then, the memory control block 51 reads, from the memory 40, the write data from the host and the generated RAID parity and transmits the same to the Backend control block 45 (S170). The Backend control block 45 transmits the write data it received to the Backend I/F Chip 34 (S171), the Backend I/F Chip 34 transmits the write data it received to the disk drive 20 (S172), and the disk drive 20 having received the write data writes the write data it received (S173), and terminates the processing for the write command.

According to the storage subsystem in this example, it is possible to configure main packages 28, 30 with function blocks having minimum configurations (Frontend control blocks 43, Backend control blocks 45, switch blocks 47, CPU I/F block 49, and memory control blocks 51) and to efficiently utilize the respective universal LSI 36s in the main packages 28, 30 by validating or invalidating the functions of the respective function blocks in the respective universal LSIs 36.

Furthermore, according to this example, in configuring a universal LSI according to the scale of the storage controller or the storage subsystem, it is possible to reduce the cost because the universal LSI 36 can be shared by validating or invalidating the functions of the respective function blocks in the universal LSI 36.

Other Examples of the Storage Subsystem

Figure 19:
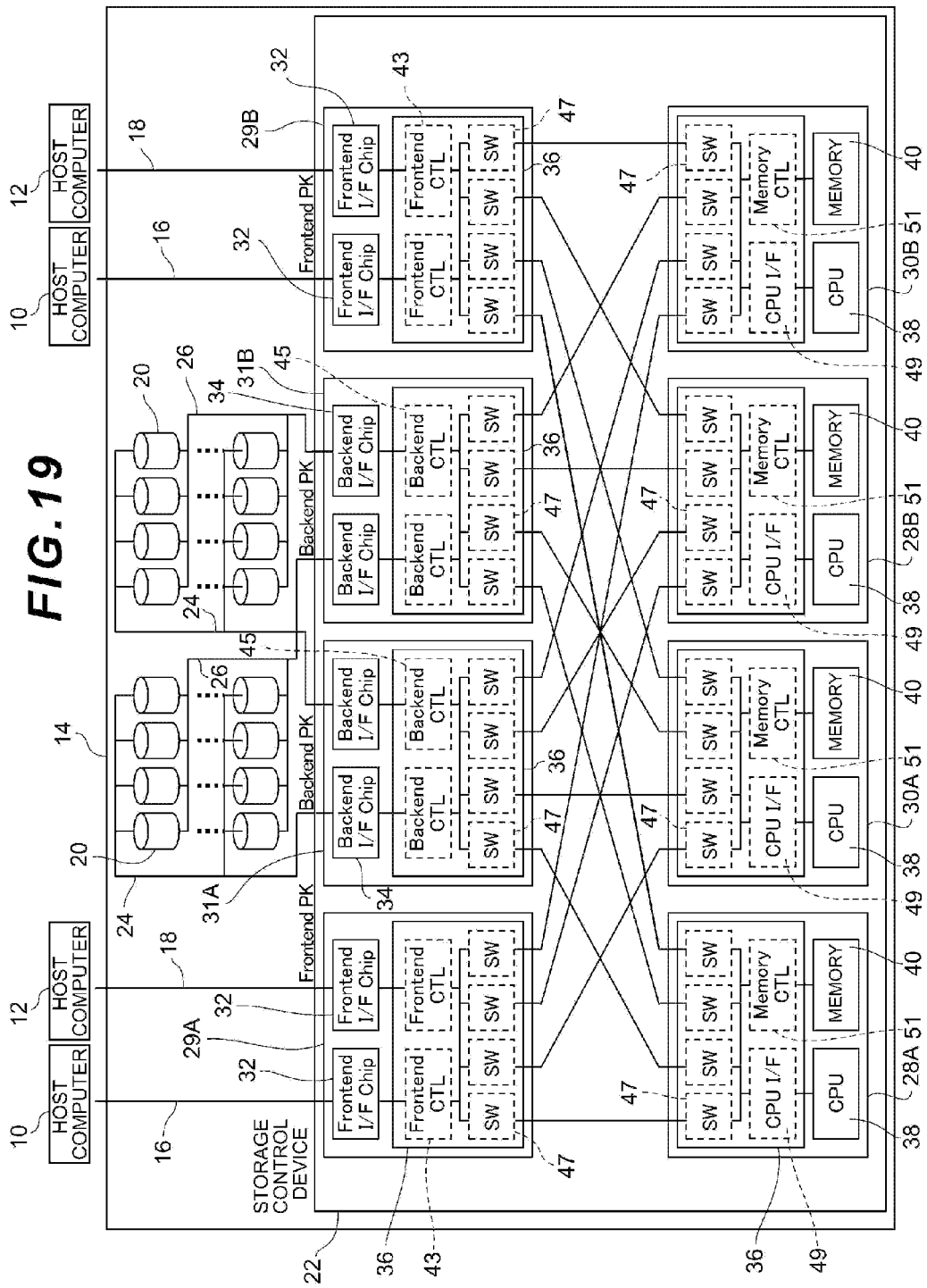
FIG. 19 is a block diagram showing the second example of a storage system.
Figure 20:
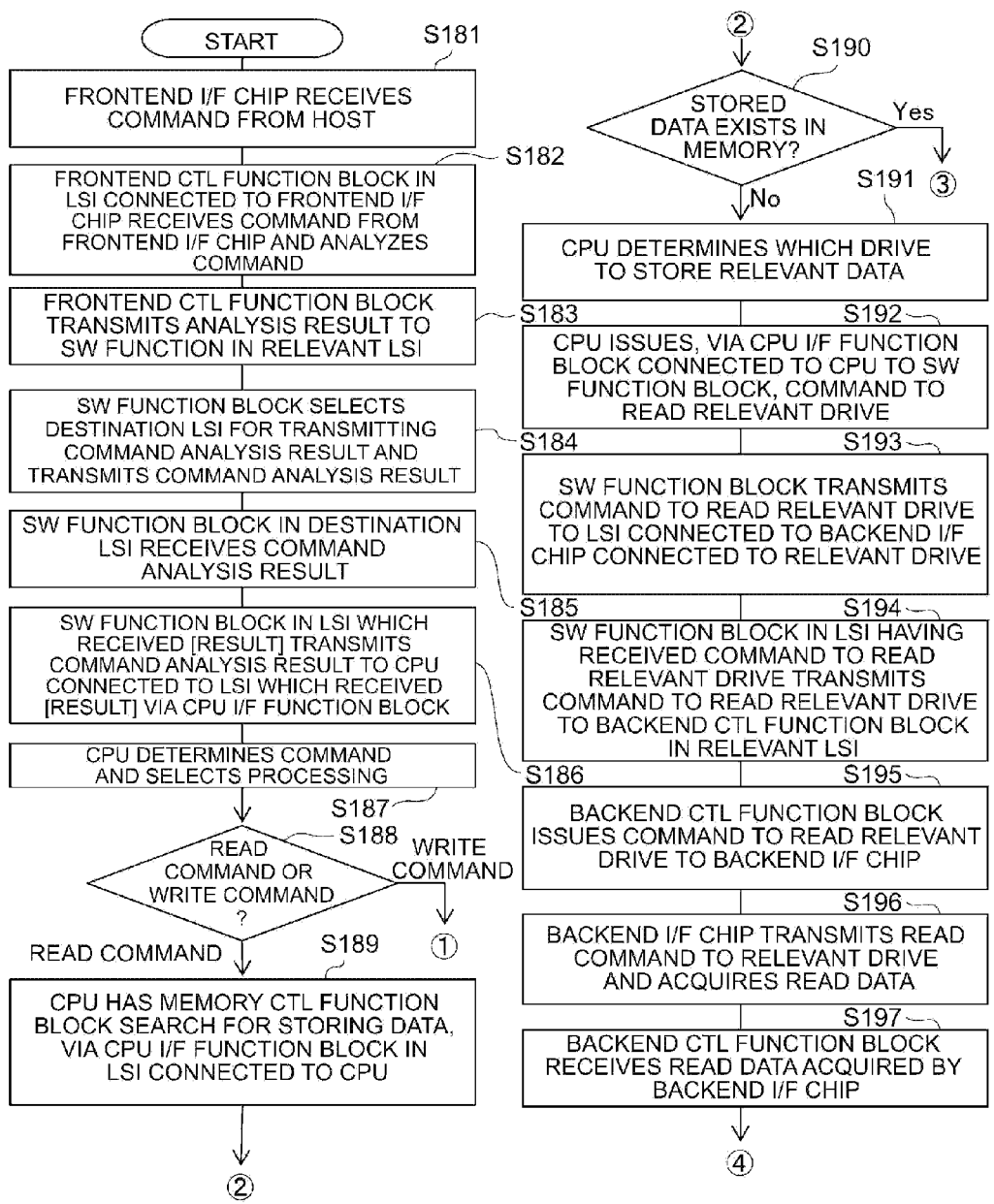
FIG. 20 is a flowchart for describing the operation of the storage system shown in FIG. 19.
Figure 21:
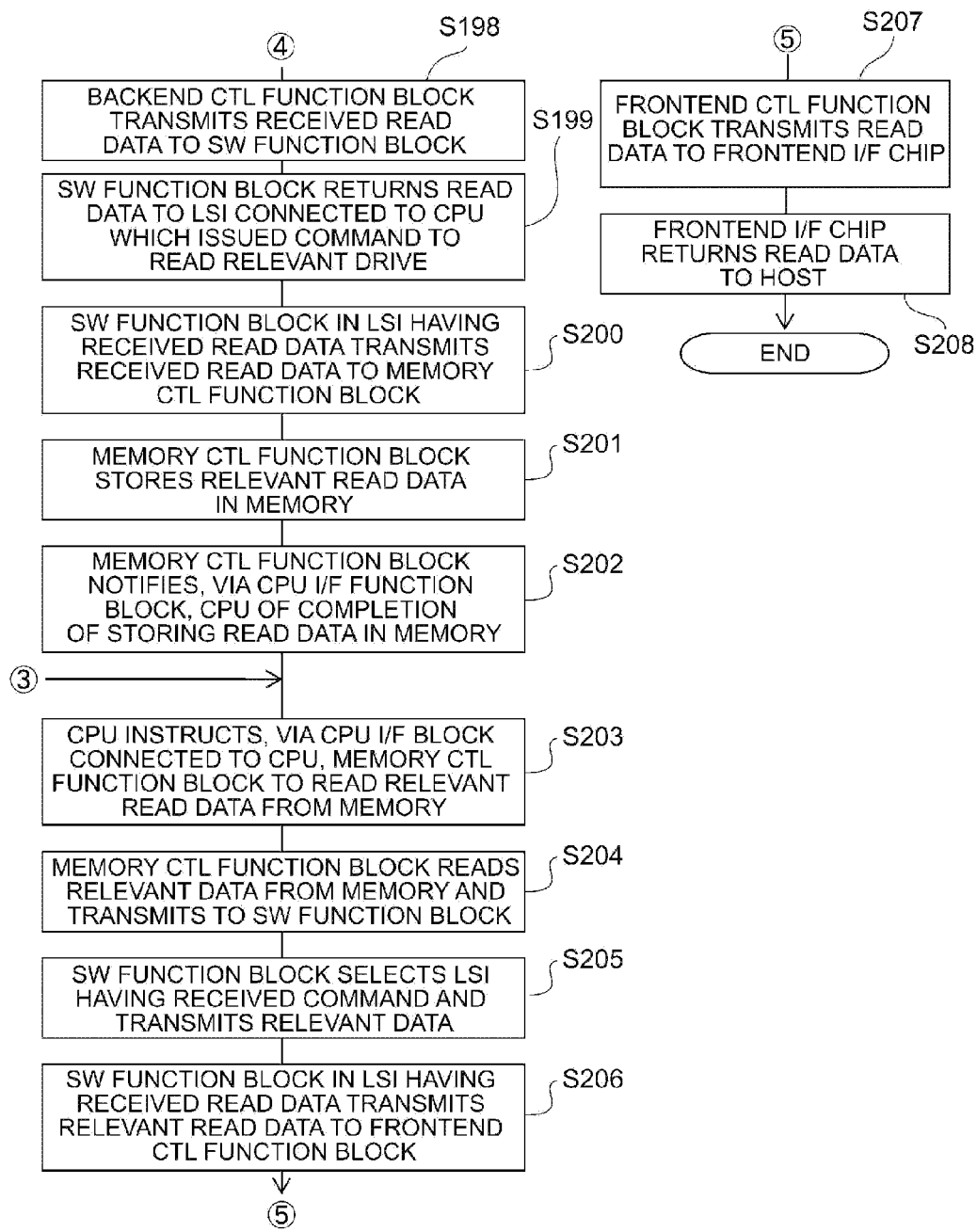
FIG. 21 is a flowchart for describing the operation of the storage system shown in FIG. 19.

Next, the configuration of a storage system as a scale-expanded version of the storage subsystem shown in FIG. 1 is shown in FIG. 19.

The storage controller 22 in this example includes two Frontend packages 29A, 29B, two Backend packages 31A, 31B, and four main packages 28A, 28B, 30A, 30B.

[Each of] the Frontend packages 29A, 29B includes two Frontend I/F Chips 32 and a universal LSI 36, and the respective Frontend I/F Chips 32 are connected to host computers 10, 12 via the networks 16, 18 respectively. [Each of] the backend packages 31A, 31B includes two Backend I/F Chips 34 and a universal LSI 36, and the respective Backend I/F Chips 34 are connected to respective disk drives 20 via the internal networks 24, 26.

In the universal LSI 36 in the Frontend package 29A, 29B, multiple Frontend control function blocks 42 and multiple switch function blocks 46 are selected by the function selection blocks 52, 54 and become Frontend control blocks 43 and switch blocks 47 respectively.

In the universal LSI 36 in the Backend package 31A, 31B, multiple Backend control function blocks 44 and multiple switch function blocks 46 are selected by the function selection blocks 52, 54 and become Backend control blocks 45 and switch blocks 47 respectively.

[Each of] the main packages 28A, 28B, 30A, and 30B includes a CPU 38, a memory 40, and a universal LSI 36.

In the universal LSI 36 in each of the main packages 28A, 28B, 30A, and 30B, a CPU I/F function block 48, a memory control function block 50, and multiple switch function blocks 46 are selected by the function selection blocks 52, 54 and become a CPU I/F block 49, a memory control block 51, and switch blocks 47 respectively. The respective switch blocks 47 in each main package 28A to 30B and the respective switch blocks 47 in each Frontend package 29A, 29B and each Backend package 31A, 31B are mutually connected.

Next, the processing of this example is described with reference to the flowcharts of FIG. 20 to FIG. 24. Firstly, if the host computer 10 issues a command, for example, the Frontend I/F Chip 32 in the Frontend package 29A receives the command (S181), the Frontend I/F Chip 32 having received the command transfers the command to the Frontend control block 43 in the universal LSI 36, and the Frontend function block 43 analyzes the command (S182) and transmits the analysis result to the switch block 47 in the universal LSI 36 (S183).

The switch block 47 selects, based on the command analysis result, a destination universal LSI 36 to transmit the command analysis result, and transmits the command analysis result to the selected universal LSI 36, for example, the universal LSI 36 in the main package 28A (S184).

When the switch block 47 in the main package 28A receives the analysis result (S185), the switch block 47 having received the command analysis result transmits, via the CPU I/F block 49, the command analysis result to the CPU 38 in the main package 28A (S186). The CPU 38 determines the command and selects the processing (S187).

The CPU 38 in the main package 28A determines whether the received command is a read command or a write command (S188) and, if it determines that the command is a write command, it proceeds to the processing in step S209, meanwhile, if it determines that the command is a read command, it instructs, via the CPU I/F block 49 in the main package 28A, the memory control block 51 to search for stored data in the memory 40. The memory control block 51 having received this instruction searches for stored data in the memory 40 and transmits the search result to the CPU 38 via the CPU I/F block 49 (S189).

If the CPU 38 determines that stored data exists in the memory 40, it proceeds to the processing of step S203, meanwhile, if it determines that no stored data exists in the memory 40, it determines the disk drive 20 storing the data (S191) and issues, via the CPU I/F block 49 connected to the CPU 38, a command to read the determined disk drive 20 to the switch block 47 (S192).

Having received the command, the switch block 47 transmits the command to read the determined disk drive 20 to the universal LSI 36 in the connection relation with the Backend I/F Chip 34 connected to the disk drive 20, for example, to the universal LSI 36 in the Backend package 31A (S193).

When the switch block 47 in the Backend package 31A receives the command, the switch block 47 transmits the command to read the disk drive 20 to the Backend control block 45 in the Backend package 31A (S194). The Backend control block 45 issues a command to read the disk drive 20 to the Backend I/F Chip 34 (S195), and the Backend I/F Chip 34 transmits the read command to the disk drive 20, and then acquires the read data from the disk drive 20 (S196), and transmits the acquired read data to the Backend control block 45.

The Backend control block 45 receives the read data (S197) and transmits the read data it received to the switch block 47 (S198). The switch block 47 returns the read data it received to the universal LSI 36 which is in the connection relation with the CPU 38 that has issued the command to read the disk drive 20 (S199).

When the switch block 47 in the main package 28A receives the read data, the switch block 47 in the main package 28A transmits the read data it received to the memory control block 51 (S200), and the memory control block 51 stores the read data in the memory 40 (S201), and then notifies, via the CPU I/F block 49, the CPU 38 of the completion of storing the read data in the memory (S202).

Meanwhile, if it is determined in step S190 that stored data exists in the memory 40, the CPU 38 instructs, via the CPU I/F block 49 connected to the CPU 38, the memory control block 51 to read the read data from the memory 40 (S203), and the memory control block 51 having received this instruction reads the read data from the memory 40, and transmits the read data to the switch block 47 (S204).

The switch block 47 having received the read data selects the universal LSI 36 in the Frontend package 29A that had received the command and transmits the data to the selected universal LSI 36 (S205). When the switch block 47 in the universal LSI 36 in the Frontend package 29A receives the read data, the switch block 47 having received the read data transmits the read data to the Frontend control block 43 (S206), the Frontend control block 43 transmits the read data to the Frontend I/F Chip 32 (S207), and the Frontend I/F Chip 32 returns the read data to the host computer 10 (S208) and terminates the for the read command.

Figure 22:
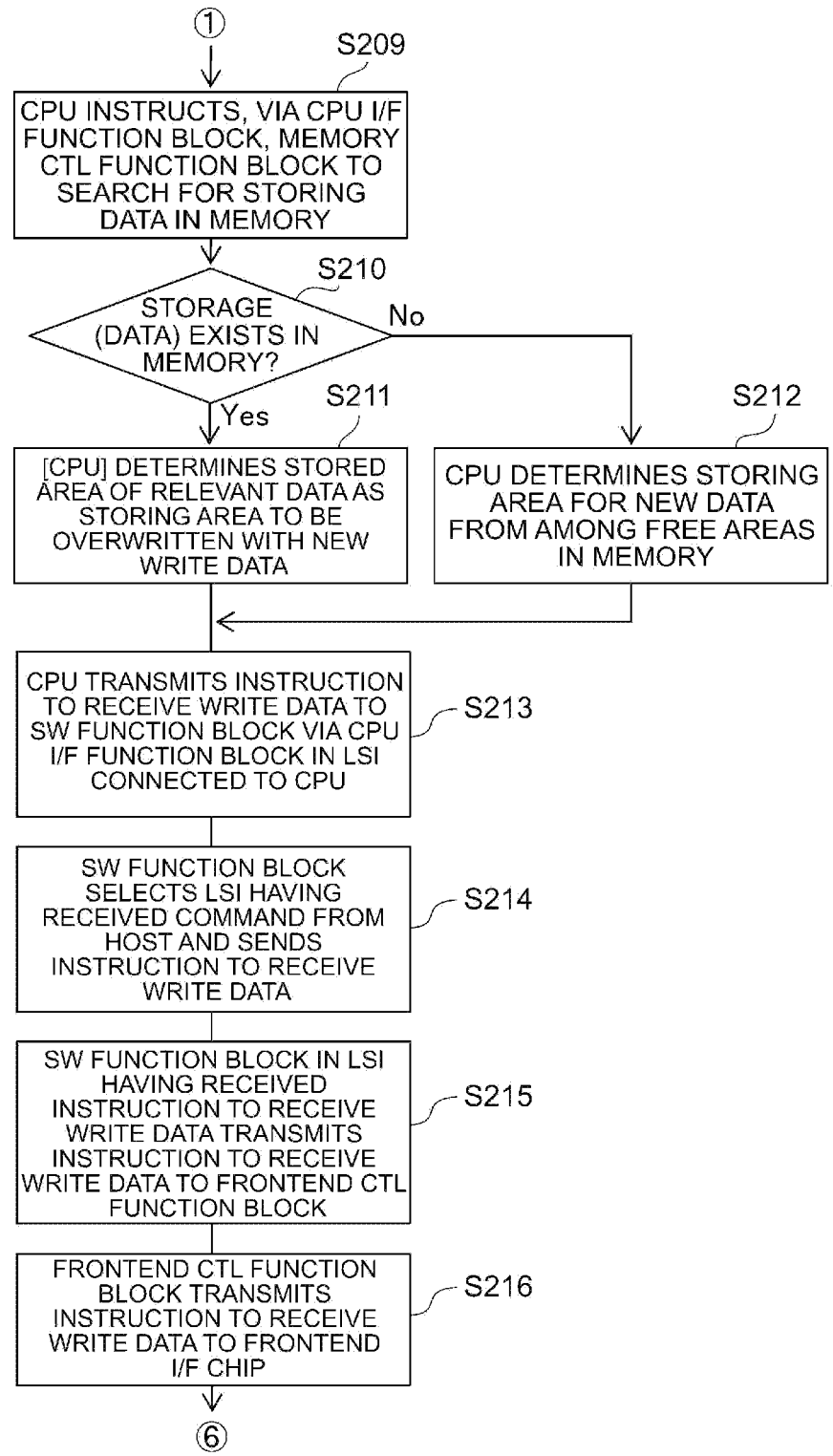
FIG. 22 is a flowchart for describing the operation of the storage system shown in FIG. 19.

Meanwhile, if it is determined in step S188 that the command is a write command, the CPU 38 proceeds to step S209 in FIG. 22 and instructs, via the CPU I/F block 49, the memory control block 51 to search for stored data in the memory 40. The memory control block 51 having received this instruction searches for stored data in the memory 40 and returns the search result to the CPU 38 via the CPU I/F block 49 (S209).

Then, the CPU 38 determines, based on the search by the memory control block 51, whether or not any stored data exists in the memory 40 (S210) and, if it determines that stored data exists in the memory 40, it determines the stored area of the data as a storing area to be overwritten with the new write data (S211) and then proceeds to the processing of step S213, meanwhile, if it determines that no stored data exists in the memory 40, it determines a new data storing area from among unused areas in the memory 40 (S212) and transmits, via the CPU I/F block 49 connected to the CPU 38, an instruction to receive the write data to the switch block 47 (S213).

The switch block 47 having received the instruction to receive the write data selects the universal LSI 36 in the sub-package 29A that has received the command from the host computer 10 and sends an instruction to receive the write data to the selected universal LSI 36 (S214), and the switch block 47 having received the instruction to receive the write data transmits the instruction to receive the write data to the Frontend control block 43 (S215).

Figure 23:
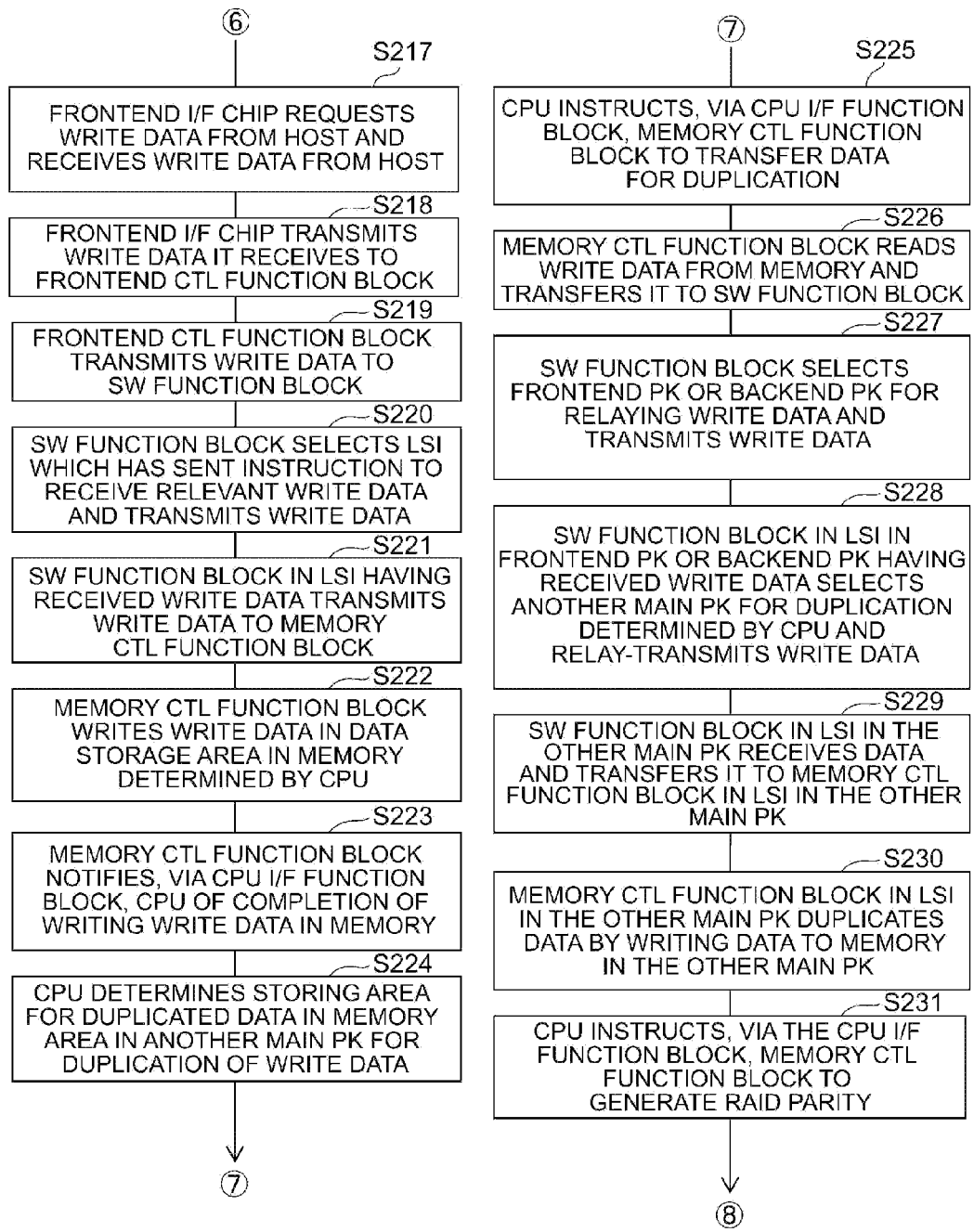
FIG. 23 is a flowchart for describing the operation of the storage system shown in FIG. 19.

The Frontend control block 43 having received the instruction to receive the write data transmits the instruction to receive the write data to the Frontend I/F Chip 32 (S216), and the Frontend I/F Chip 32, requests the host computer 10 to transmit the write data, and receives the write data from the host computer 10 as shown in FIG. 23 (S217).

Then, when the Frontend I/F Chip 32 receives the write data transmitted from the host computer 10, it transmits the write data it received to the Frontend control block 43 (S218), and the Frontend control block 43 transmits the write data to the switch block 47 (S219).

The switch block 47 having received the write data, selects the universal LSI 36 that has sent the instruction to receive the write data, that is, the universal LSI 36 in the main package 28A, and transmits the write data to the selected universal LSI 36 (S220).

The universal LSI 36 having received the write data, transmits the write data to the memory control block 51 (S221), and the memory control block 51 writes the write data to the data storing area determined by the CPU 38 (S222), and then notifies, via the CPU I/F block 49, the CPU 38 of the completion of writing the write data to the memory 40 (S223). The CPU 38 determines, for the duplication of the write data, a storing area for duplicated data in the memory area of another main package (S224).

Then, the CPU 38 instructs, via the CPU I/F block 49, the memory control block 51 to transfer the data for the duplication (S225), and the memory control block 51 having received this instruction reads the write data from the memory 40 and transfers the read write data to the switch block 47 (S226).

The switch block 47 having received the write data selects, as a package for relaying the write data, the Frontend package 29A, 29B or the Backend package 31A, 31B, and transmits the write data to the selected package (S227). In this case, for example, [the switch block 47] selects the Frontend package 29A or the Backend package 31A and transmits the write data to the selected Frontend package 29A or the Backend package 31A.

Then, the switch block 47 in the Frontend package 29A or the Backend package 31A having received the write data selects, for the duplication of the data, another main package determined by the CPU 38, for example, the main package 30A, and transmits the write data to the selected main package 30A (S228).

When the switch block 47 in the other main package, that is, the main package 30A receives the write data, the switch block 47 in the other main package 30A transfers the write data it received to the memory control block 51 in the main package 30A (S229), and the memory control block 51 in the main package 30A duplicates the data by writing the data to the memory 40 in the main package 30A (S230).

Figure 24:
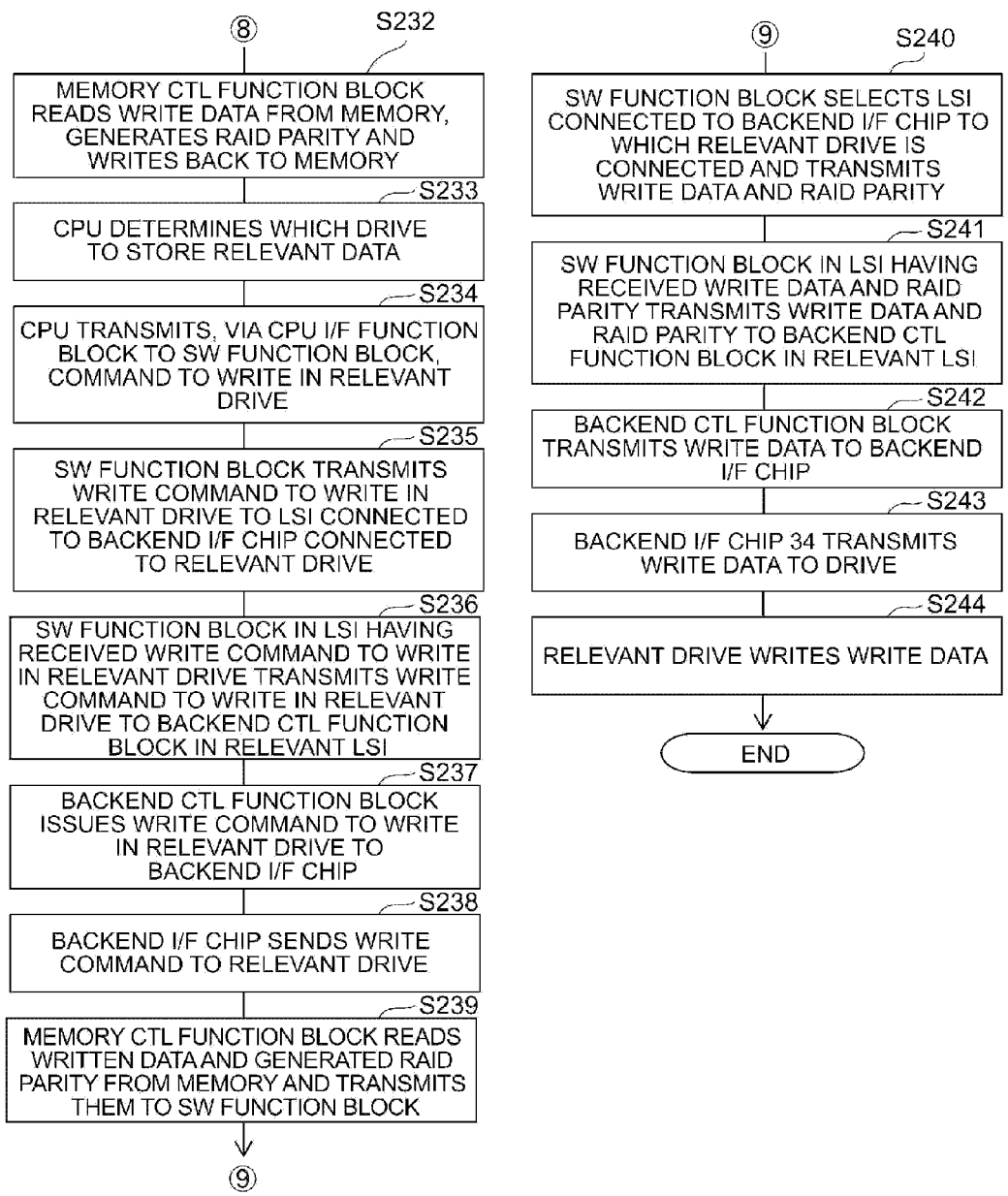
FIG. 24 is a flowchart for describing the operation of the storage system shown in FIG. 19.

Subsequently, the CPU 38 instructs, via the CPU I/F block 49, the memory control block 51 to generate a RAID parity (S231), and the memory control block 51 having received this instruction reads, as shown in FIG. 24, the write data from the memory 40, generates a RAID parity based on the write data it read, and writes the generated RAID parity back to the memory 40 (S232).

Then, the CPU 38 determines the disk drive 20 for storing the write data (S233) and transmits, via the CPU I/F block 49, a write command to write to the disk drive 20 to the switch block 47 (S234). The switch block 47 having received the write command transmits the write command to write to the disk drive 20 to the Backend package in the connection relation with the Backend I/F Chip 34 connected to the disk drive 20, for example, to the universal LSI 36 in the Backend package 31A (S235). The switch block 47 having received the write command to write to the disk drive 20 transmits the write command to write to the disk drive 20 to the Backend control block 45 in the universal LSI 36 in the Backend package 31A (S236).

Then, the Backend control block 45 having received the write command issues, to the Backend I/F Chip 34, a write command to write to the disk drive 20 (S237), and the Backend I/F Chip 34 having received the write command transmits the write command to the disk drive 20 (S238). The CPU 38 also instructs, via the CPU I/F block 49, the memory control block 51 to read the written data and the generated RAID parity from the memory 40, and the memory control block 51 having received the instruction from the CPU 38 reads the written data and the generated RAID parity from the memory 40, and transmits the same to the switch block 47 (S239).

Then, the switch block 47 having received the written data and the generated RAID parity selects the universal LSI 36 in the Backend package 31A in the connection relation with the Backend I/F Chip 34 to which the disk drive 20 is connected and transmits the written data and the RAID parity to the selected universal LSI 36 (S240). The switch block 47 having received the written data and the RAID parity transmits the written data and the RAID parity to the Backend control block 45 (S241).

The Backend control block 45 having received the written data and the RAID parity transmits the write data to the Backend I/F Chip 34 (S242), and the Backend I/F Chip 34 transmits the write data to the disk drive 20 (S243), and the disk drive 20 having received the write data writes the write data (S244) and terminates the processing for the write command.

According to this example, it is possible to, when intending to expand a storage subsystem, enable the expansion by adding, as different types of packages, main packages, Frontend packages, and Backend packages in accordance with the scale and it is also possible to efficiently utilize a universal LSI 36 installed in each package by validating or invalidating respective function blocks in the universal LSI 36. Particularly in expanding the storage subsystem, using universal LSIs 36 that validate only required functions allows adding required functions only, which provides flexibility and reduces the cost.

Furthermore, according to this example, in configuring a universal LSI in accordance with the expansion of the storage subsystem, it is possible to share the universal LSI 36 and thereby reducing the development cost by validating or invalidating the functions of respective function blocks in the universal LSI 36,

REFERENCE SIGN LIST

10, 12 Host computer
14 Storage subsystem
16, 18 Network
20 Disk drive
22 Storage controller
24, 26 Internal network
28, 30 main package
32 Frontend I/F Chip
34 Backend I/F Chip
36 Universal LSI
38 CPU
40 Memory
42 Frontend control function block
43 Frontend control block
44 Backend control function block
45 Backend control block
46 Switch function block
47 Switch block
48 CPU I/F function block
49 CPU I/F block
50 Memory control function block
51 Memory control block
52, 54 function selection block
56 Selection setting input unit
58 Selection setting record unit
60 Selection setting output unit
62 Automatic determination block
64 Function selection management block
66 Function selection information table

The invention claimed is:

1. A storage controller comprising:
first interface modules for transmitting/receiving information to/from host computers;
second interface modules for transmitting/receiving information to/from storage devices;
processing modules for processing data based on commands inputted from the host computers via the first interface modules;
memory modules for temporarily storing data stored/fetched in/from the storage devices; and
one or more relay processing modules each connected to the first interface modules, the second interface modules, the processing modules and the memory modules and transmitting/receiving signals to/from each of the connected modules,
wherein the relay processing modules each include a plurality of function blocks integrating functions for controlling the respective modules and, when connected to the respective modules, the function blocks corresponding to the connected modules among the plurality of function blocks are validated and the other function blocks are invalidated, and
wherein the relay processing modules each includes:
a plurality of function selection blocks arranged on a plurality of signal transmission paths that connect a set of groups, each group including one or more of the function blocks, to the respective modules; and
a selection setting block for recording a selection instruction signal input from the outside of the relay processing module and outputting the inputted selection instruction signal to the respective function selection blocks, and
wherein each of the function selection blocks selects one of the function blocks belonging to the respective group in response to a selection instruction signal from the selection setting block, connects the selected function block and the respective module, and even when a selection instruction signal from the outside of the relay processing module stops, holds a record of an inputted selection instruction signal.

2. The storage controller according to claim 1, wherein the plurality of function blocks include:
a first interface control function block for generating a first control signal to control the first interface module and transmitting/receiving a signal to/from the first interface module;
a second interface control function block for generating a second control signal to control the second interface module and transmitting/receiving a signal to/from the second interface module;
a memory control function block for executing processing to input/output data to/from the memory module;
a third interface function block for transmitting an instruction from the processing module to a function block designated by the instruction among the plurality of function blocks and transmitting a signal from each of the function blocks to the processing module; and
a switch function block for transmitting a signal from any of the function blocks to the outside of the relay processing module and transmitting a signal from the outside of the relay processing module to any of the function blocks, the relay processing modules each include a plurality of function selection blocks arranged on a plurality of signal transmission paths that connect a set of groups, each group including one or more of the function blocks, to the respective modules, and each of the function selection blocks selects one of the function blocks belonging to the respective group according to a selection instruction signal, and connect the selected function block and the respective module.

3. The storage controller according to claim 1, wherein the relay processing modules each includes a plurality of function selection blocks arranged on a plurality of signal transmission paths that connect a set of groups, each group including one or more of the function blocks, to the respective modules, and each of the function selection blocks selects one of the function blocks belonging to the respective group in response to a selection instruction signal inputted from the outside of the relay processing module and connect the selected function block and the respective module.

4. The storage controller according to claim 1, wherein the relay processing modules each include:
a plurality of function selection blocks arranged on a plurality of signal transmission paths that connect a set of groups, each group including one or more of the function blocks, to the respective modules; and
a plurality of automatic determination blocks for determining a connection target for each of the function selection blocks based on a signal transmitted to each of the connected modules through each of the signal transmission paths and outputting a selection instruction signal according to the determination to the respective function blocks, and each of the function selection blocks selects one of the function blocks belonging to the respective group in response to a selection instruction signal from the respective automatic determination blocks, and connect the selected function block and the respective module.

5. The storage controller according to claim 1,
wherein the relay processing modules each include a function selection management block for collecting, from the respective function selection blocks, function selection information for identifying function blocks selected by the respective function selection blocks and managing the function selection information, and
wherein the function selection management blocks are arranged in the respective relay processing modules in a distributed manner, and each function selection management block arranged in a distributed manner exchanges the function selection information, records it in a function selection information table and determines a transfer destination for a signal based on the function selection information recorded in the function selection information table.

6. The storage controller according to claim 1, wherein the relay processing modules each includes a plurality of function selection blocks arranged on a plurality of signal transmission paths that connect a set of groups, each group including one or more of the function blocks, to the respective modules, and each of the function selection blocks selects one of the function blocks belonging to the respective group according to a selection instruction signal inputted from the outside of the relay processing module, connect the selected function block and the respective module, and mask signals from other function blocks than the selected function block.

7. The storage controller according to claim 1,
wherein each of the function selection blocks further masks signals from function blocks other than the selected function block.

8. A storage controller comprising:
first interface modules for transmitting/receiving information to/from host computers;
second interface modules for transmitting/receiving information to/from storage devices;
processing modules for processing data based on commands inputted from the host computers via the first interface modules;
memory modules for temporarily storing data stored/fetched in/from the storage devices; and
one or more relay processing modules each connected to the first interface modules, the second interface modules, the processing modules and the memory modules and transmitting/receiving signals to/from each of the connected modules,
wherein the relay processing modules each include a plurality of function blocks integrating functions for controlling the respective modules and, when connected to the respective modules, the function blocks corresponding to the connected modules among the plurality of function blocks are validated and the other function blocks are invalidated,
wherein the relay processing modules each include:
a plurality of function selection blocks arranged on a plurality of signal transmission paths that connect a set of groups, each group including one or more of the function blocks, to the respective modules; and
a plurality of automatic determination blocks for determining a connection target for each of the function selection blocks based on a signal transmitted to each of the connected modules through each of the signal transmission paths and outputting a selection instruction signal according to the determination to the respective function blocks, and
wherein each of the function selection blocks selects one of the function blocks belonging to the respective group in response to a selection instruction signal from the respective automatic determination block, connects the selected function block and the respective module, and masks signals from other function blocks than the selected function block.

9. A storage subsystem comprising:
a storage apparatus including a plurality of storage devices; and
a storage controller for controlling input/output of data to/from the storage apparatus,
wherein, the storage controller includes:
first interface modules for transmitting/receiving information to/from host computers; second interface modules for transmitting/receiving information with the storage apparatus;
processing modules for processing data based on commands inputted from the host computers via the first interface modules;
memory modules for temporarily storing data stored/fetched in/from the storage apparatus; and one or more relay processing modules each connected to the first interface modules, the second interface modules, the processing modules and the memory modules and transmitting/receiving a signal to/from each of the connected modules,
wherein the relay processing modules each include a plurality of function blocks integrating functions for controlling the respective modules and, when connected to the respective modules, the function blocks corresponding to the connected modules among the plurality of function blocks are validated and the other function blocks are invalidated,
wherein the relay processing modules each includes:
a plurality of function selection blocks arranged on a plurality of signal transmission paths that connect a set of groups to the respective modules, each group including one or more of the function blocks; and
a selection setting block for recording a selection instruction signal inputted from the outside of the relay, processing module and outputting the inputted selection instruction signal to the respective function selection blocks, and
wherein each of the function selection blocks selects one of the function blocks belonging to the respective group in response to a selection instruction signal from the selection setting block, connects the selected function block and the respective module, and even when a selection instruction signal from the outside of the relay processing module stops, holds a record of an inputted selection instruction signal.

10. The storage subsystem according to claim 9, wherein the relay processing modules each includes a plurality of function selection blocks arranged on a plurality of signal transmission paths that connect a set of groups, each group including one or more of the function blocks, to the respective modules, and each of the function selection blocks selects one of the function blocks belonging to the respective group in response to a selection instruction signal inputted from the outside of the relay processing module and connect the selected function block and the respective module.

11. The storage subsystem according to claim 9, wherein the relay processing modules each include:

a plurality of automatic determination blocks for determining a connection target for each of the function selection blocks based on a signal transmitted to each of the connected modules through each of the signal transmission paths and outputting a selection instruction signal according to the determination to the respective function blocks, and each of the function selection blocks selects one of the function blocks belonging to the respective group in response to a selection instruction signal from the respective automatic determination block, and connects the selected function block and the respective module.

* * * * *